US009933755B2

(12) United States Patent
Lee

(10) Patent No.: US 9,933,755 B2
(45) Date of Patent: Apr. 3, 2018

(54) APPARATUS FOR MEASURING RESPONSE TIME, SYSTEM FOR MEASURING RESPONSE TIME AND METHOD FOR MEASURING RESPONSE TIME

(71) Applicant: Sam Won Lee, Hwaseong-si (KR)

(72) Inventor: Sam Won Lee, Hwaseong-si (KR)

(73) Assignee: DOOSAN HEAVY INDUSTRIES & CONSTRUCTION CO., LTD., Gyeongsangnam (KR)

( * ) Notice: Subject to any disclaimer, the term of this patent is extended or adjusted under 35 U.S.C. 154(b) by 684 days.

(21) Appl. No.: 14/478,164

(22) Filed: Sep. 5, 2014

(65) Prior Publication Data
US 2015/0088460 A1 Mar. 26, 2015

(30) Foreign Application Priority Data

Sep. 28, 1920 (KR) ........................ 10-2013-0112768

(51) Int. Cl.
*G01F 3/00* (2006.01)
*G04F 10/00* (2006.01)
*G06F 11/34* (2006.01)
*H04N 17/04* (2006.01)
*G05B 23/02* (2006.01)

(52) U.S. Cl.
CPC .......... *G04F 10/00* (2013.01); *G06F 11/3419* (2013.01); *G06F 11/3485* (2013.01); *H04N 17/04* (2013.01); *G05B 23/0256* (2013.01)

(58) Field of Classification Search
CPC . G06F 11/3419; G06F 11/3485; H04N 17/04; G05B 23/0256; G04F 10/00

USPC .................... 702/178, 103; 367/13
See application file for complete search history.

(56) References Cited

U.S. PATENT DOCUMENTS

| 4,736,250 | A | * | 4/1988 | Blazo | H04N 5/335 348/559 |
| 4,942,614 | A | * | 7/1990 | Hamilton | G01R 23/16 367/13 |
| 5,325,339 | A | * | 6/1994 | Yost | G01D 5/48 367/13 |

(Continued)

FOREIGN PATENT DOCUMENTS

| CN | 102316357 A | 1/2012 |
| JP | 2006180294 A | 7/2006 |

(Continued)

OTHER PUBLICATIONS

Korean Office Action for KR 10-2013-0112768 dated Dec. 1, 2014.
(Continued)

*Primary Examiner* — Toan Le
*Assistant Examiner* — Xiuquin Sun
(74) *Attorney, Agent, or Firm* — Harness, Dickey & Pierce, P.L.C.

(57) ABSTRACT

Example embodiments relate to a response time measurement apparatus, a response time measurement system and a response time measurement method for measuring a response output time from a facility corresponding to an input signal, and more particularly, a response time measurement apparatus, a response time measurement system and a response time measurement method in which the output display of a facility is captured through a capture device to detect an output time on the basis thereof.

14 Claims, 8 Drawing Sheets

(56) References Cited

U.S. PATENT DOCUMENTS

| | | | |
|---|---|---|---|
| 6,868,047 B2* | 3/2005 | Sartschev | G01R 31/3193 368/113 |
| 2012/0172118 A1 | 7/2012 | Shimamura et al. | |

FOREIGN PATENT DOCUMENTS

| | | | |
|---|---|---|---|
| JP | 2007315899 A | 12/2007 | |
| JP | 2009130820 A | 6/2009 | |
| JP | 2009171334 A | 7/2009 | |
| KR | 20110125048 A | 11/2011 | |
| WO | WO 0175373 A1 * | 10/2001 | F24F 11/001 |
| WO | WO-2014149593 A1 | 9/2014 | |

OTHER PUBLICATIONS

Shimizu, T. et al, "International real-time streaming of 4K digital cinema," Science Direct, pp. 929-939, May 30, 2006.
Jansen, J. et al., "Enabling Composition-Based Video-Conferencing for the Home," IEEE, pp. 1-22, 2010.
Extended European Search Report dated Mar. 11, 2015.
Korean Office Action dated Aug. 21, 2014.

* cited by examiner (a)

(b)

(d)

(c)

(a)

(b)

(a)

(b)

ABRASUS FOR MEASURING RESPONSE TIME, SYSTEM FOR MEASURING RESPONSE TIME AND METHOD FOR MEASURING RESPONSE TIME

CROSS-REFERENCE TO RELATED APPLICATIONS

This application claims the benefit of Korean Patent Application No. 10-2013-0112768, filed on Sep. 23, 2013, the entire contents of which is hereby incorporated by reference for all purposes as if fully set forth herein.

BACKGROUND

1. Field

The present disclosure relates to a response time measurement apparatus, a response time measurement system and a response time measurement method for measuring a response output time from a facility corresponding to an input signal, and more particularly, to a response time measurement apparatus, a response time measurement system and a response time measurement method for detecting an output time through a capture device for capturing the output of a facility to measure a response time.

2. Description of the Related Art

For the response time measurement of a system before digital facilities, a signal is externally applied to a digital or analog input module installed at a controller thereof, and a signal being output to a digital or analog output board is measured using an instrument such as an oscilloscope between the input and the output to measure a signal response time.

For digital facilities, the output of a facility is displayed on a console unit separated therefrom, but since a computer screen (MMI) has been introduced, the measurement of a response time is based on a time at which the output is displayed on a computer screen.

FIG. 1 is a flow chart illustrating a method of measuring a response time in a digital facility in the related art.

As illustrated in FIG. 1, for the measurement of a response time in a digital facility in the related art, a test signal is applied to an input module installed in a controller of the facility, and a time required for the output corresponding to the test signal arrives at the computer screen of the facility is measured, and at this time, the measurement of a response time may be carried out using a stop watch method from a time at which the test signal is applied until the output is displayed on the computer screen.

The stop watch method which is a conventional response time measurement method has low time measurement accuracy. Furthermore, when the output screen varies frequently, the detection of the displayed output is not so easy, thereby causing difficulties in measurement. Furthermore, it has lower accuracy compared to a method of measuring an input time and an output time in comparison, thereby causing inaccurate response time measurement.

SUMMARY

Accordingly, in order to solve the foregoing problems in the related art, there is provided a response time measurement apparatus, a response time measurement system and a response time measurement method in which the output display of a facility is captured through a capture device to detect an output time on the basis thereof, thereby measuring an accurate, effective output time, enhancing measurement accuracy, and automating data measurement as well as detecting an output regardless of the form and type of facility, the type of test signal, and the type of output, measuring a response time in an easy and convenient manner, and enhancing flexibility with a simple configuration expected to be applicable to various fields.

In order to accomplish the foregoing task, a response time measurement apparatus disclosed in the present disclosure may include a transceiver configured to receive capture information from a capture device for capturing the output screen of a measurement target facility, and a controller configured to apply a test signal to the measurement target facility through the transceiver, and detect a response output time which is a time at which a response corresponding to the test signal is displayed on the output screen based on the capture information, and measure a response time of the measurement target facility based on the response output time.

According to an example embodiment, the measurement target facility may include at least one of a plant consisting of a plurality of devices, a power facility, a communication facility, a transportation facility, a video facility, a control and management facility, an analog facility, a digital facility, a small-sized home appliance, a robot and a computer.

According to an example embodiment, the capture device may be a camera capable of capturing an image or video.

According to an example embodiment, the capture information may include at least one of an image, a video in which the output screen of the measurement target facility is captured, and time information on which the output of the measurement target facility is captured.

According to an example embodiment, the test signal may be a control signal for inducing a specific output to be displayed on the output screen of the measurement target facility.

According to an example embodiment, the response output time may be a time at which an output is displayed on the output screen to generate a screen change on the output screen.

According to an example embodiment, the controller may calculate a time difference between a time at which the test signal is applied and the response output time, and measure the time difference as a response time of the measurement target facility.

According to an example embodiment, the capture information may include a plurality of images on which the output screen is consecutively captured and time information on which each image is captured, and the controller may detect an output image displayed with a specific output corresponding to the test signal among the plurality of images contained in the capture information and time information on which the output image is captured, and subtract a time at which the test signal is applied from a time at which the output image is captured to measure a response time of the measurement target facility.

According to an example embodiment, the plurality of images may be images consecutively captured from a time at which the test signal is applied.

According to an example embodiment, the time at which the output image is captured may be the same as the response output time or a time for which a time consumed for capture is compensated to be the same as the response output time.

According to an example embodiment, the capture information may include a plurality of images on which the output screen is consecutively captured from a time at which the test signal is applied and time information on which each image is captured, and the controller may detect a screen change image on which a change is generated on the output screen among the plurality of images and time information on which the screen change image is captured, and subtract a time at which the test signal is applied from a time at which the screen change image is captured to measure a response time of the measurement target facility.

According to an example embodiment, the screen change image may be detected in comparison with an image prior to a change occurring on the output screen.

According to an example embodiment, the time at which the screen change image is captured may be the same as the response output time or a time for which a time consumed for capture is compensated to be the same as the response output time.

According to an example embodiment, the screen change image may be detected based on a change occurred at a specific portion of the output screen.

Furthermore, in order to solve the foregoing task, a response time measurement apparatus disclosed in the present disclosure may include a transceiver configured to receive capture information from a capture device for capturing the operation of a measurement target facility, and a controller configured to apply a test signal to the measurement target facility through the transceiver, and detect an operation generation time at which a response corresponding to the test signal is generated by the operation of the measurement target facility based on the capture information, and measure a response time of the measurement target facility based on the operation generation time.

According to an example embodiment, the measurement target facility may be a facility for performing a mechanical operation.

According to an example embodiment, the capture device may be a camera capable of capturing an image and a video.

According to an example embodiment, the capture information may include at least one of an image, a video in which the operation of the measurement target facility is captured and time information on which the operation of the measurement target facility is generated.

According to an example embodiment, the test signal may be a control signal for inducing a specific operation of the measurement target facility.

According to an example embodiment, the operation generation time may be a time at which a specific operation corresponding to the test signal is generated while the measurement target facility is stopped or performs a specific operation to generate an operation change of the measurement target facility.

According to an example embodiment, the controller may calculate a time difference between a time at which the test signal is applied and the operation generation time, and measure the time difference as a response time of the measurement target facility.

According to an example embodiment, the capture information may include a plurality of images on which the operation of the measurement target facility is consecutively captured from a time at which the test signal is applied and time information on which each image is captured, and the controller may detect an operation image on which a specific operation corresponding to the test signal is generated among the plurality of images and time information on which the operation image is captured, and subtract a time at which the test signal is applied from a time at which the operation image is captured to measure a response time of the measurement target facility.

According to an example embodiment, the operation image may be detected by comparing it with an image prior to generating the specific operation.

According to an example embodiment, the time at which the operation image is captured is the same as the operation generation time or a time for which a time consumed for capture is compensated to be the same as the operation generation time.

In order to solve the foregoing task, a response time measurement apparatus disclosed in the present disclosure may include a transceiver configured to receive capture information from a capture device for capturing the output screen of a measurement target facility, and a controller configured to apply a test signal to the measurement target facility through the transceiver, and measure a response time of the measurement target facility based on the capture information, wherein the capture device detects a response output time which is a time at which a response corresponding to the test signal is displayed on the output screen, and generates capture information containing the response output time.

According to an example embodiment, the measurement target facility may include at least one of a plant consisting of a plurality of devices, a power facility, a communication facility, a transportation facility, a video facility, a control and management facility, an analog facility, a digital facility, a small-sized home appliance, a robot and a computer.

According to an example embodiment, the capture device may be a camera capable of capturing an image or video as well as capable of identifying the captured image and detecting the response output time.

According to an example embodiment, the capture information may further include either one of an image and a video in which the output screen of the measurement target facility is captured.

According to an example embodiment, the test signal may be a control signal for inducing a specific output to be displayed on the output screen of the measurement target facility.

According to an example embodiment, the response output time may be a time at which an output is displayed on the output screen to generate a screen change on the output screen.

According to an example embodiment, the controller may calculate a time difference between a time at which the test signal is applied and the response output time, and measure the time difference as a response time of the measurement target facility.

According to an example embodiment, the capture device may consecutively capture the output screen to generate a plurality of images and time information on which each image is captured, and detect an output image displayed with a specific output corresponding to the test signal among the plurality of images and time information on which the output image is captured, and detect the response output time based on time information on which the output image is captured, and detect the response output time based on the time information on which the output image is captured to generate the capture information containing the output image and the response output time, and the controller may detect the response output time contained in the capture information, and subtract a time at which the test signal is applied from the response output time to measure a response time of the measurement target facility.

According to an example embodiment, the plurality of images may be images consecutively captured from a time at which the test signal is applied.

According to an example embodiment, the capture device may consecutively capture the output screen from a time at which the test signal is applied to generate a plurality of images and time information on which each image is captured, and detect a screen change image on which a change is generated on the output screen among the plurality of images and time information on which the screen change image is captured, and detect the response output time based on time information on which the screen change image is captured, and detect the response output time based on the time information on which the screen change image is captured to generate the capture information containing the screen change image and the response output time, and the controller may detect the response output time contained in the capture information, and subtract a time at which the test signal is applied from the response output time to measure a response time of the measurement target facility.

According to an example embodiment, the screen change image may be detected by comparing it with an image prior to generating a change on the output screen.

According to an example embodiment, the screen change image may be detected based on a change generated on a specific portion of the output screen.

According to an example embodiment, the capture device may be automatically captured.

According to an example embodiment, the capture device and the transceiver may be controlled by the controller.

According to an example embodiment, the test signal and the capture information may be transmitted or received with digital or analog type signals.

According to an example embodiment, the controller may determine whether or not there is an error of the measurement result, and repeat the test when the reimplementation of the measurement is required.

In order to accomplish the foregoing task, a response time measurement system disclosed in the present disclosure may include a response time measurement apparatus including a capture device configured to capture an output screen of a measurement target facility, and generate capture information, a transceiver configured to receive the capture information, and a controller configured to apply a test signal to the measurement target facility through the transceiver, and detect a response output time which is a time at which a response corresponding to the test signal is displayed on the output screen based on the capture information, and measure a response time of the measurement target facility based on the response output time.

According to an example embodiment, the measurement target facility may include at least one of a plant consisting of a plurality of devices, a power facility, a communication facility, a transportation facility, a video facility, a control and management facility, an analog facility, a digital facility, a small-sized home appliance, a robot and a computer.

According to an example embodiment, the capture device may be a camera capable of capturing an image or video.

According to an example embodiment, the capture information may include at least one of an image, a video in which the output screen of the measurement target facility is captured, and time information on which the output of the measurement target facility is captured.

According to an example embodiment, the test signal may be a control signal for inducing a specific output to be displayed on the output screen of the measurement target facility.

According to an example embodiment, the response output time may be a time at which an output is displayed on the output screen to generate a screen change on the output screen.

According to an example embodiment, the controller may calculate a time difference between a time at which the test signal is applied and the response output time, and measure the time difference as a response time of the measurement target facility.

According to an example embodiment, the capture information may include a plurality of images on which the output screen is consecutively captured and time information on which each image is captured, and the controller may detect an output image displayed with a specific output corresponding to the test signal among the plurality of images contained in the capture information and time information on which the output image is captured, and subtract a time at which the test signal is applied from a time at which the output image is captured to measure a response time of the measurement target facility.

According to an example embodiment, the plurality of images may be images consecutively captured from a time at which the test signal is applied.

According to an example embodiment, the time at which the output image is captured may be the same as the response output time or a time for which a time consumed for capture is compensated to be the same as the response output time.

According to an example embodiment, the capture information may include a plurality of images on which the output screen is consecutively captured from a time at which the test signal is applied and time information on which each image is captured, and the controller may detect a screen change image on which a change is generated on the output screen among the plurality of images and time information on which the screen change image is captured, and subtract a time at which the test signal is applied from a time at which the screen change image is captured to measure a response time of the measurement target facility.

According to an example embodiment, the screen change image may be detected in comparison with an image prior to a change occurring on the output screen.

According to an example embodiment, the time at which the screen change image is captured may be the same as the response output time or a time for which a time consumed for capture is compensated to be the same as the response output time.

According to an example embodiment, the screen change image may be detected based on a change occurred at a specific portion of the output screen.

In order to accomplish the foregoing task, a response time measurement system disclosed in the present disclosure may include a response time measurement apparatus including a capture device configured to capture an output screen of a measurement target facility, and generate capture information, a transceiver configured to receive the capture information, and a controller configured to apply a test signal to the measurement target facility through the transceiver, and measure a response time of the measurement target facility based on the capture information, and the capture device may detect a response output time which is a time at which a response corresponding to the test signal is displayed on the output screen, and generate capture information containing the response output time.

According to an example embodiment, the measurement target facility may include at least one of a plant consisting of a plurality of devices, a power facility, a communication facility, a transportation facility, a video facility, a control and management facility, an analog facility, a digital facility, a small-sized home appliance, a robot and a computer.

According to an example embodiment, the capture device may be a camera capable of capturing an image or video as well as capable of identifying the captured image and detecting the response output time.

According to an example embodiment, the capture information may further include an image and a video in which the output of the measurement target facility is captured.

According to an example embodiment, the test signal may be a control signal for inducing a specific output to be displayed on the output screen of the measurement target facility.

According to an example embodiment, the response output time may be a time at which an output is displayed on the output screen to generate a screen change on the output screen.

According to an example embodiment, the controller may calculate a time difference between a time at which the test signal is applied and the response output time, and measure the time difference as a response time of the measurement target facility.

According to an example embodiment, the capture device may consecutively capture the output screen to generate a plurality of images and time information on which each image is captured, and detect an output image displayed with a specific output corresponding to the test signal among the plurality of images and time information on which the output image is captured, and detect the response output time based on time information on which the output image is captured, and detect the response output time based on the time information on which the output image is captured to generate the capture information containing the output image and the response output time, and the controller may detect the response output time contained in the capture information, and subtract a time at which the test signal is applied from the response output time to measure a response time of the measurement target facility.

According to an example embodiment, the plurality of images may be images consecutively captured from a time at which the test signal is applied.

According to an example embodiment, the capture device may consecutively capture the output screen from a time at which the test signal is applied to generate a plurality of images and time information on which each image is captured, and detect a screen change image on which a change is generated on the output screen among the plurality of images and time information on which the screen change image is captured, and detect the response output time based on time information on which the screen change image is captured, and detect the response output time based on the time information on which the screen change image is captured to generate the capture information containing the screen change image and the response output time, and the controller may detect the response output time contained in the capture information, and subtract a time at which the test signal is applied from the response output time to measure a response time of the measurement target facility.

According to an example embodiment, the screen change image may be detected by comparing it with an image prior to generating a change on the output screen.

According to an example embodiment, the screen change image may be detected based on a change generated on a specific portion of the output screen.

According to an example embodiment, the capture device may be automatically captured.

According to an example embodiment, the capture device and the transceiver may be controlled by the controller.

According to an example embodiment, the test signal and the capture information may be transmitted or received with digital or analog type signals.

According to an example embodiment, the controller may determine whether or not there is an error of the measurement result, and repeat the test when the reimplementation of the measurement is required.

In order to solve the foregoing task, a method of measuring a response time disclosed in the present disclosure may include applying a test signal to a measurement target facility, capturing a response output corresponding to the test signal displayed on the output screen of the measurement target facility with a capture device, receiving the capture information from the capture device, detecting the response output time based on the capture information, and measuring a response time of the measurement target facility based on the response output time.

According to an example embodiment, the measurement target facility may include at least one of a plant consisting of a plurality of devices, a power facility, a communication facility, a transportation facility, a video facility, a control and management facility, an analog facility, a digital facility, a small-sized home appliance, a robot and a computer.

According to an example embodiment, the capture device may be a camera capable of capturing an image or video.

According to an example embodiment, the capture information may include at least one of an image, a video in which the output screen of the measurement target facility is captured, and time information on which the output of the measurement target facility is captured.

According to an example embodiment, the test signal may be a control signal for inducing a specific output to be displayed on the output screen of the measurement target facility.

According to an example embodiment, the response output time may be a time at which an output is displayed on the output screen to generate a screen change on the output screen.

According to an example embodiment, said measuring a response time of the measurement target facility based on the response output time may calculate a time difference between a time at which the test signal is applied and the response output time, and measure the time difference as a response time of the measurement target facility.

According to an example embodiment, the capture information may include a plurality of images on which the output screen is consecutively captured and time information on which each image is captured, and said detecting the response output time based on the capture information may detect an output image displayed with a specific output corresponding to the test signal among the plurality of images contained in the capture information and time information on which the output image is captured, and said measuring a response time of the measurement target facility based on the response output time may subtract a time at which the test signal is applied from a time at which the output image is captured to measure a response time of the measurement target facility.

According to an example embodiment, the plurality of images may be images consecutively captured from a time at which the test signal is applied.

According to an example embodiment, the time at which the output image is captured may be the same as the response output time or a time for which a time consumed for capture is compensated to be the same as the response output time.

According to an example embodiment, the capture information may include a plurality of images on which the output screen is consecutively captured from a time at which the test signal is applied and time information on which each image is captured, and said detecting the response output time based on the capture information may detect a screen change image on which a change is generated on the output screen among the plurality of images and time information on which the screen change image is captured, and said measuring a response time of the measurement target facility based on the response output time may subtract a time at which the test signal is applied from a time at which the screen change image is captured to measure a response time of the measurement target facility.

According to an example embodiment, the screen change image may be detected in comparison with an image prior to a change occurring on the output screen.

According to an example embodiment, the time at which the screen change image is captured may be the same as the response output time or a time for which a time consumed for capture is compensated to be the same as the response output time.

According to an example embodiment, the screen change image may be detected based on a change occurred at a specific portion of the output screen.

In order to solve the foregoing task, a method of measuring a response time disclosed in the present disclosure may include applying a test signal to a measurement target facility, capturing a response output corresponding to the test signal displayed on the output screen of the measurement target facility with a capture device, detecting a response output time from the capture device, and generating capture information containing the response output time, receiving the capture information from the capture device, detecting the response output time contained in the capture information, and measuring a response time of the measurement target facility based on the response output time.

According to an example embodiment, the measurement target facility may include at least one of a plant consisting of a plurality of devices, a power facility, a communication facility, a transportation facility, a video facility, a control and management facility, an analog facility, a digital facility, a small-sized home appliance, a robot and a computer.

According to an example embodiment, the capture device may be a camera capable of capturing an image or video as well as capable of identifying the captured image and detecting the response output time.

According to an example embodiment, the capture information may further include an image and a video in which the output of the measurement target facility is captured.

According to an example embodiment, the test signal may be a control signal for inducing a specific output to be displayed on the output screen of the measurement target facility.

According to an example embodiment, the response output time may be a time at which an output is displayed on the output screen to generate a screen change on the output screen.

According to an example embodiment, said detecting the response output time contained in the capture information may calculate a time difference between a time at which the test signal is applied and the response output time, and measure the time difference as a response time of the measurement target facility.

According to an example embodiment, said capturing a response output corresponding to the test signal displayed on the output screen of the measurement target facility with a capture device consecutively may capture the output screen to generate a plurality of images and time information on which each image is captured, and said detecting a response output time from the capture device, and generating capture information containing the response output time may detect an output image displayed with a specific output corresponding to the test signal among the plurality of images and time information on which the output image is captured, and detect the response output time based on time information on which the output image is captured to generate the capture information containing the output image and the response output time, and said measuring a response time of the measurement target facility based on the response output time may subtract a time at which the test signal is applied from the response output time to measure a response time of the measurement target facility.

According to an example embodiment, the plurality of images may be images consecutively captured from a time at which the test signal is applied.

According to an example embodiment, said capturing a response output corresponding to the test signal displayed on the output screen of the measurement target facility with a capture device consecutively may capture the output screen from a time at which the test signal is applied to generate a plurality of images and time information on which each image is captured, and said detecting a response output time from the capture device, and generating capture information containing the response output time may detect a screen change image on which a change is generated on the output screen among the plurality of images and time information on which the screen change image is captured, and detect the response output time based on time information on which the screen change image is captured to generate the capture information containing the screen change image and the response output time, and said measuring a response time of the measurement target facility based on the response output time may subtract a time at which the test signal is applied from the response output time to measure a response time of the measurement target facility.

According to an example embodiment, the screen change image may be detected by comparing it with an image prior to generating a change on the output screen.

According to an example embodiment, the screen change image may be detected based on a change generated on a specific portion of the output screen.

According to an example embodiment, the capture device may be automatically captured.

According to an example embodiment, the test signal and the capture information may be transmitted or received with digital or analog type signals.

According to an example embodiment, the method may further include determining whether or not there is an error of the measurement result, and repeating the test when the reimplementation of the measurement is required.

A response time measurement apparatus, a response time measurement system and a response time measurement method disclosed in the present disclosure may have an effect of enhancing the accuracy of measurement compared to a method of using a stop watch in the related art through an output detection method using vision as well as automating data measurement through an output detection scheme using vision.

Furthermore, it may be possible to have an effect of detecting an output regardless of the form and type of facility, the type of input test signals, and the type of output, measuring a response time in an easy and convenient manner, and enhancing flexibility with a simple configuration expected to be applicable to various fields through an output detection scheme using vision.

BRIEF DESCRIPTION OF THE DRAWINGS

The accompanying drawings, which are included to provide a further understanding of example embodiment and are incorporated in and constitute a part of this specification, illustrate example embodiments and together with the description serve to explain the principles of example embodiments.

In the drawings.

DETAILED DESCRIPTION OF EXAMPLE EMBODIMENTS

Figure 1:
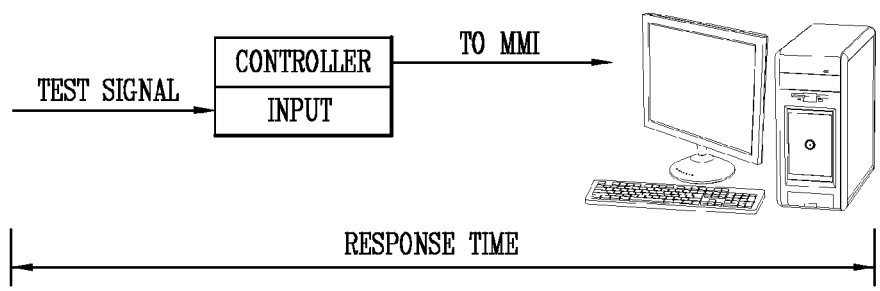
FIG. 1 is a flow chart illustrating a response time measurement method of a digital facility in the related art.

Technologies disclosed in the present disclosure may be applicable to a response time measurement apparatus, a response time measurement system and a response time measurement method. However, technologies disclosed in the present disclosure may not be necessarily limited to this, and may be also applicable to all industrial facilities and systems in the related art, such as plant, power, communication, image, broadcast, measurement, control, robot, computer and automation equipment, and other facilities and systems to which the technical concept of the present disclosure is applicable. In particular, a plant which is a large-scale facility group may include a measurement control facility or system to control various facilities and devices, and for an example, technologies disclosed in the present disclosure may be applicable to a field that requires precise and speedy device operation and measurement control such as a man machine interface system (MMIS) applicable to a nuclear power plant.

Hereinafter, the embodiments disclosed herein will be described in detail with reference to the accompanying drawings, and the same or similar elements are designated with the same numeral references regardless of the numerals in the drawings and their redundant description will be omitted.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., a 3D display device). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

<Response Time Measurement Apparatus>

Hereinafter, an embodiment of a response time measurement apparatus (hereinafter, referred to as an "apparatus") disclosed in the present disclosure will be described with reference to FIGS. 2 and 3.

Figure 2:
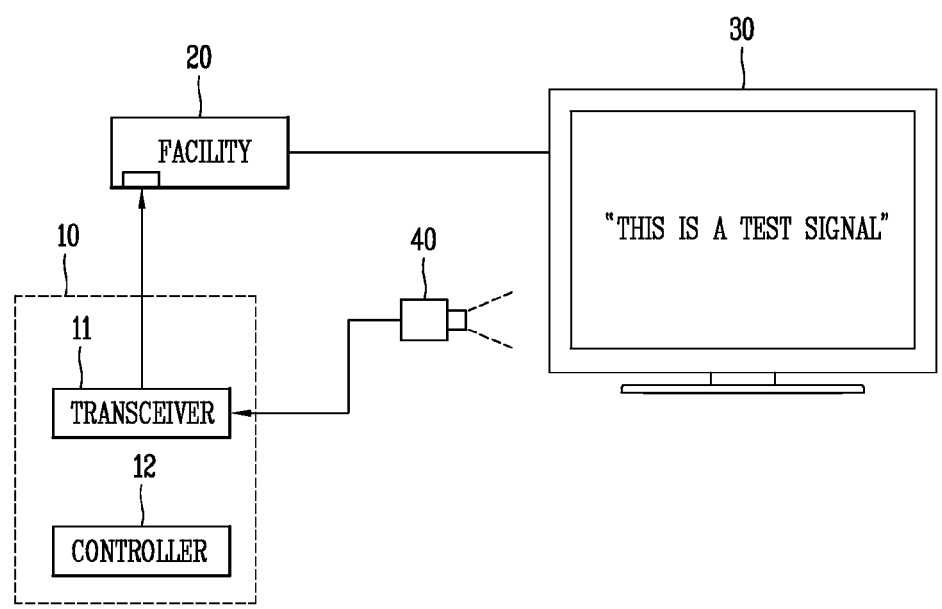
FIG. 2 is a configuration diagram illustrating a response time measurement apparatus according to an example embodiment.

FIG. 2 is a configuration diagram 1 illustrating a response time measurement apparatus disclosed in the present disclosure.

Figure 3:
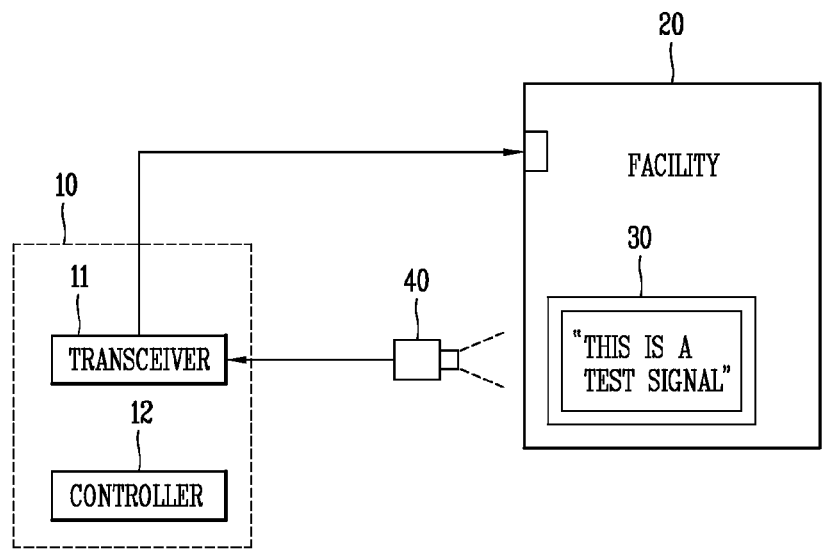
FIG. 3 is a configuration diagram illustrating a response time measurement apparatus according to an example embodiment.

FIG. 3 is a configuration diagram 2 illustrating a response time measurement apparatus disclosed in the present disclosure.

[First embodiment] Detection of response output time in measurement apparatus

First, the configuration of a measurement apparatus will be described with reference to FIGS. 2 and 3.

As illustrated in FIGS. 2 and 3, a measurement apparatus 10 may include a transceiver 11 configured to receive capture information from a capture device 40 for capturing the output screen 30 of a measurement target facility 20, and a controller 12 configured to apply a test signal to the measurement target facility 20 through the transceiver 11, and detect a response output time which is a time at which a response corresponding to the test signal is displayed on the output screen 30 based on the capture information, and measure a response time of the measurement target facility 20 based on the response output time.

The measurement apparatus 10 may have the form of a typical measurement device or a portable small-sized instrument such as a digital meter.

Furthermore, the measurement apparatus 10 may be an apparatus contained in a large-scale facility group, and may have a detachable form which is detachable from the facility group.

Furthermore, the measurement apparatus 10 may have a module form contained in a device such as a computer or the like.

For example, the measurement apparatus 10 may be hardware, firmware, hardware executing software or any combination thereof. When the measurement apparatus 10 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the measurement apparatus 10. CPUs, DSPs, ASICs and FPGAs may generally be referred to as processors and/or microprocessors.

In the event where the measurement apparatus 10 is a processor executing software, the processor is configured as a special purpose machine to execute the software to perform the functions of the measurement apparatus 10. In such an embodiment, the processor may include one or more Central Processing Units (CPUs), digital signal processors (DSPs), application-specific-integrated-circuits (ASICs), field programmable gate arrays (FPGAs) computers. The controller 12 may be considered the processor in this instance.

The measurement target facility 20 may include at least one of a plant consisting of a plurality of devices, a power facility, a communication facility, a transportation facility, a video facility, a control and management facility, an analog facility, a digital facility, a small-sized home appliance, a robot and a computer.

The plant may denote a production facility or plant configured with an industrial device, a machine tool, an electrical device, a communication device and the like as an integrated body, and there may be a large-scale power plant or the like for an example.

The measurement apparatus 10 applicable to the plant may be applicable to a central control facility performing the control of each device constituting the plant or the entire control of the plant.

For example, the measurement apparatus 10 may be applicable to a nuclear measurement control system (MMIS), or instrument, generator, transformer and the like which are the detailed configuration of the nuclear power plant.

The power facility denotes all facilities associated with power such generators, transformers, transmission and distribution facilities and incoming transfer facilities, instruments, control facilities, control systems, and the like.

The measurement target facility 20 may be connected to the transceiver 11 included in the measurement apparatus 10, and may include the output screen 30.

The measurement target facility 20 may receive the test signal through the transceiver 11 included in the measurement apparatus 10, and display the output of the measurement target facility 20 corresponding to the test signal on the output screen 30.

The output screen 30 denotes a display screen on which an output corresponding to an input signal applied to the measurement target facility 20 is displayed.

The output screen 30 may be externally configured to be separated from the measurement target facility 20 as illustrated in FIG. 2, or configured to be included in the measurement target facility 20 as illustrated in FIG. 3.

When the output screen 30 is externally configured to be separated from the measurement target facility 20, the output screen 30 may be a display device of a console computer for controlling the measurement target facility 20 or a monitor additionally connected thereto.

When the output screen 30 is externally configured to be separated from the measurement target facility 20, a location at which the output screen 30 is installed may be arranged regardless of the location of the measurement target facility 20.

For example, when the measurement target facility 20 is located at the "a"-th floor of building "A", the output screen 30 may be installed at another floor of building "A" or installed in building "B", "C" and so on other than building "A".

When the output screen 30 is configured to be included in the measurement target facility 20, the output screen 30 may be a display unit configured at any one portion of the measurement target facility 20 or display apparatus additionally mounted thereon.

For example, the output screen 30 may be a monitor of an integrated computer, an LCD of a mobile terminal, an LCD of a digital meter, a display unit of a home appliance such as an air conditioner, a cleaner, and the like.

The capture device 40 may be a camera capable of automatically capturing the output screen 30.

For example, when the response output is displayed on the output screen 30 or a change is generated on the output screen 30, the capture device 40 may automatically capture the output screen 30.

Furthermore, the capture device 40 may perform a capture operation under the control of the controller 12.

For example, when the controller 12 applies the test signal to the measurement target facility 20 through the transceiver 11, the capture device 40 may be subject to the control of the controller 12 to capture the response output to be displayed on the output screen 30.

The capture device 40 may be a camera capable of image capture or video capture, and storing the captured image and video as data.

Furthermore, the capture device 40 may be either one of a manual camera or automatic camera, and transmit the capture information to the measurement apparatus 10.

The capture information may be generated based on a result of capturing the output screen 30 by the capture device 40.

The capture information may include at least one of an image, a video in which the output screen 30 of the measurement target facility 20 is captured and time information on which the output of the measurement target facility 20 is captured.

For example, the capture information may include only an image in which the output screen 30 is captured, or include an image in which the output screen 30 is captured and time information on which the output of the measurement target facility 20 is captured, or include both an image, a video and the time information on which the output screen 30 is captured.

The test signal may be applied to an input end of the measurement target facility 20.

The test signal may be applied to the measurement target facility 20 with an analog or digital mode signal.

The test signal may be a control signal for inducing a specific output to be displayed on the output screen 30 of the measurement target facility 20.

For example, a numeral, a symbol, a picture, a photo, a specific phrase or the like indicating a test signal may be displayed on the output screen 30.

Figure 4:
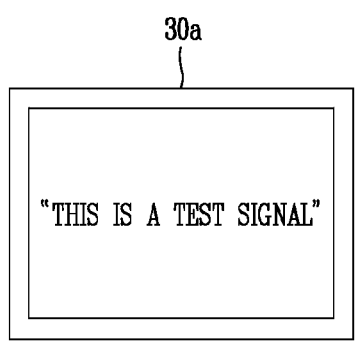
FIG. 4 is an exemplary view illustrating a test signal of a response time measurement apparatus according to an example embodiment.
Figure 4:
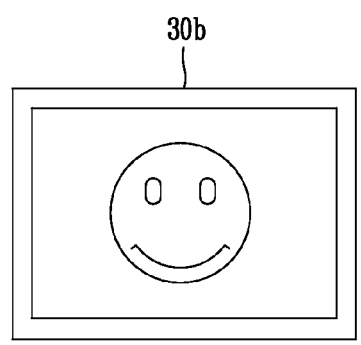
Figure 4:
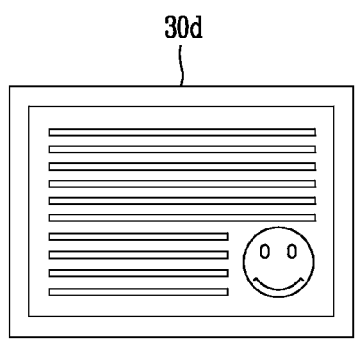
Figure 4:
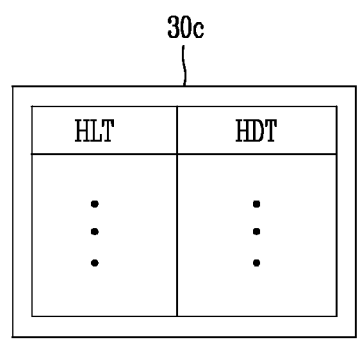

FIG. 4 is an exemplary view illustrating a test signal of a response time measurement apparatus disclosed in the present disclosure.

The test signal may display a specific phrase indicating a test signal on the output screen 30 as illustrated in FIG. 4A, or display a specific picture as illustrated in FIG. 4B.

Otherwise, the test signal may display a specific interface for test as illustrated in FIG. 4C, or display a specific phrase or picture indicating a test signal at a specific portion of the output screen 30 as illustrated in FIG. 4D.

For example, when the measurement apparatus 10 applies a test signal for allowing a phrase "This is a test signal" to be displayed on the output screen 30 to the measurement target facility 20, the phrase "This is a test signal" as illustrated in FIG. 4A will be displayed on the output screen 30.

The response output time may be a time at which an output is displayed on the output screen 30 to generate a screen change on the output screen 30.

Here, the screen change denotes displaying a response of the measurement target facility 20 corresponding to the test signal on the output screen 30 to make a change from a screen prior to the output to a screen on which the response is displayed.

In other words, a screen change is generated on the output screen 30 by the response output, wherein a time at which the screen change is generated becomes the response output time.

The transceiver 11 is subject to the control of the controller 12.

The transceiver 11 may include an analog or digital input/output terminal, and transmit and receive a signal between the measurement target facility 20 and the capture device 40.

The controller 12 controls the transceiver 11 to apply the test signal to the measurement target facility 20, and measures a response time based on the capture information received at the transceiver 11.

The controller 12 calculates a time difference between a time at which the test signal is applied and the response output time to measure the time difference as a response time of the measurement target facility 20.

In other words, when a time at which the test signal is applied is subtracted from the response output time, the response time of the measurement target facility 20 is calculated.

For example, in case where the time at which the test signal is applied is "10:05:03", and the response output time is "10:05:05", a period of time "00:00:02" in which the time at which the test signal is applied is subtracted from the response output time will be a response time of the measurement target facility 20.

Hereinafter, a specific embodiment of the first embodiment of a response time measurement apparatus disclosed in the present disclosure will be described.

[Embodiment 1-1] Detection of output image in measurement apparatus

[Embodiment 1-1] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement apparatus 10 may include a transceiver 11 configured to receive capture information from the capture device 40 for capturing the output screen 30 of the measurement target facility 20, and a controller 12 configured to apply a test signal to the measurement target facility 20 through the transceiver 11, and detect a response output time which is a time at which a response corresponding to the test signal is displayed on the output screen 30 based on the capture information, and measure a response time of the measurement target facility 20 based on the response output time, wherein the capture information may include a plurality of images on which the output screen 30 is consecutively captured and time information on which each image is captured, and the controller 12 detects an output image displayed with a specific output corresponding to the test signal among the plurality of images contained in the capture information and time information on which the output image is captured, and subtracts a time at which the test signal is applied from a time at which the output image is captured to measure a response time of the measurement target facility 20.

Here, the plurality of consecutively captured images are multiple images in which the capture device 40 has captured the output screen 30 several times for a continuous period of time.

For example, when the capture device 40 has captured the output screen 30 for four seconds, four images may be captured once per second or two images once per two seconds.

Furthermore, the plurality of images may be images consecutively captured for a predetermined and/or desired period of time.

For example, they may be images captured several times for a continuous period of time from a time at which the test signal is applied to a time at which the response output is displayed on the output screen 30.

Figure 5:
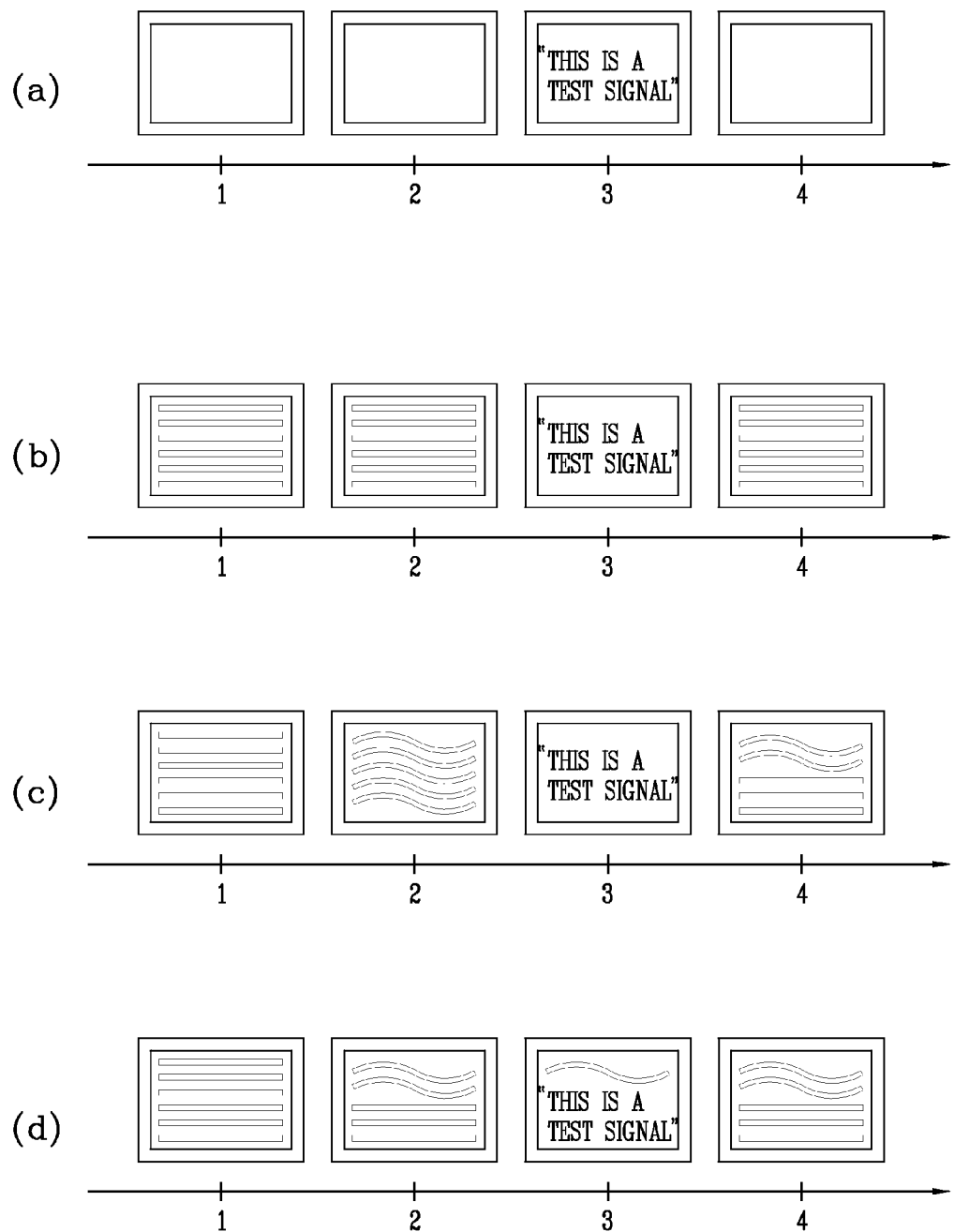
FIG. 5 is an exemplary view illustrating a plurality of images of a response time measurement apparatus according to an example embodiment.

FIG. 5 is an exemplary view illustrating a plurality of images of a response time measurement apparatus disclosed in the present disclosure.

As illustrated in FIG. 5A, the plurality of images may be images in which the output screen 30 in a non-display state is captured several times for a continuous period of time until the response output is displayed.

Furthermore, as illustrated in FIG. 5B, the plurality of images may be images in which the output screen 30 on which another output is displayed is captured several times for a continuous period of time until the response output is displayed.

Furthermore, as illustrated in FIG. 5C, the plurality of images may be images in which the output screen 30 in a state that a change is generated on the screen is captured several times for a continuous period of time until the response output is displayed.

Furthermore, as illustrated in FIG. 5D, the plurality of images may be images in which the output screen 30 in a state that a change is generated at a specific portion of the screen is captured several times for a continuous period of time until the response output is displayed.

The capture information may include the plurality of images in which the capture device 40 has captured the output screen 30 several times for a continuous period of time and time information on which each image is captured.

For example, when the output screen 30 has been captured four times for four seconds from "10:05:00" to "10:05:04", a first captured image may include time information "10:05:01", and a second captured image, a third captured image and a fourth captured image may include time information "10:05:02", "10:05:03" and "10:05:04", respectively.

When the capture information is received at the transceiver 11, the controller 12 may detect an output image on which a specific output corresponding to the test signal is displayed among a plurality of images contained in the capture information.

For example, when a test signal for allowing a phrase "This is a test signal" to be displayed on the output screen 30 is applied to the measurement target facility 20, the controller 12 detects an output image on which the phrase "This is a test signal" is captured among the plurality of images.

In other words, the controller 12 may detect an output image on which an output corresponding to the response output is first captured among the plurality of images.

Furthermore, the controller 12 may detect time information on which each image is captured through the detected output image.

For example, when the output image is captured at "10:05:04", the controller 12 may detect the capture time information of "10:05:04" which is a time at which the output image is captured through the detected output image.

Here, the time at which the output image is captured is the same as the response output time or a time for which a time consumed for capture is compensated to be the same as the response output time.

For example, when a time at which the response output is displayed on the output screen 30 is "10:05:04" and a time at which the response output is captured is "10:05:04.5", the controller 12 compensates 0.5 second consumed for the capture for a time at which the response output is captured, and as a result, the time at which the output image is captured is the same as the response output time.

The controller 12 may subtract a time at which the test signal is applied from a time at which the detected output image is captured to measure a response time of the measurement target facility 20.

For example, when the time at which the test signal is applied is "10:05:05", and the time at which the output image is captured is "10:05:09", the controller 12 may subtract a time at which the test signal is applied from a time at which the output image is captured to measure a response time of the measurement target facility, and thus the subtraction result "00:00:04" is measured as a response time of the measurement target facility 20.

The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

[Embodiment 1-2] Detection of screen change image in measurement apparatus

[Embodiment 1-2] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement apparatus 10 may include a transceiver 11 configured to receive capture information from the capture device 40 for capturing the output screen 30 of the measurement target facility 20, and a controller 12 configured to apply a test signal to the measurement target facility 20 through the transceiver 11, and detect a response output time which is a time at which a response corresponding to the test signal is displayed on the output screen 30 based on the capture information, and measure a response time of the measurement target facility 20 based on the response output time, wherein the capture information may include a plurality of images on which the output screen 30 is consecutively captured from a time at which the test signal is applied and time information on which each image is captured, and the controller 12 detects a screen change image on which a change is generated on the output screen 30 among the plurality of images and time information on which the screen change image is captured, and subtracts a time at which the test signal is applied from a time at which the screen change image is captured to measure a response time of the measurement target facility 20.

Here, the plurality of consecutively captured images are multiple images in which the capture device 40 has captured the output screen 30 several times for a continuous period of time from the time at which the test signal is applied.

For example, when the capture device 40 has captured the output screen 30 for four seconds from the time at which the test signal is applied, four images may be captured once per second or two images once per two seconds.

The capture information may be the plurality of images in which the capture device 40 has captured the output screen 30 several times for a continuous period of time and time information on which each image is captured.

For example, when the output screen 30 has been captured four times for four seconds from "10:05:00" to "10:05:04", a first captured image may include time information "10:05:01", and a second captured image, a third captured image and a fourth captured image may include time information "10:05:02", "10:05:03" and "10:05:04", respectively.

When the capture information is received at the transceiver 11, the controller 12 may detect the screen change image on which a change is generated on the output screen 30 among a plurality of images contained in the capture information.

Here, the screen change image denotes an image in which a screen on which a change is generated on the output screen 30 is captured due to the response output of the measurement target facility 20 corresponding to the test signal.

In other words, the screen change image denotes an image in which the response output is captured.

For example, when the measurement apparatus 10 applies a test signal for allowing a phrase "This is a test signal" to be displayed on the output screen 30 to the measurement target facility 20, the controller 12 may compare an image in which a change is generated on the output screen 30 with an image prior to generating a change on the output screen 30, and detect the screen change image when determined that a change has been generated due to a difference on the entire or a specific portion of the output screen 30, and the screen change image may be an image on which the phrase "This is a test signal" is displayed.

In other words, the controller 12 may detect a screen change image in which a screen on which a change is generated on the output screen 30 due to the response output corresponding to the terminal among the plurality of images.

Furthermore, the controller 12 may detect time information on which the screen change image is captured through the detected screen change image.

For example, when the screen change image is captured at "10:05:04", the controller 12 may detect the capture time information of "10:05:04" which is a time at which the screen change image is captured through the detected screen change image.

Here, the time at which the screen change image is captured is the same as the response output time or a time for which a time consumed for capture is compensated to be the same as the response output time.

For example, when a time at which the response output is displayed on the output screen 30 is "10:05:04" and a time at which the response output is captured is "10:05:04.5", the controller 12 compensates 0.5 second consumed for the capture for a time at which the screen change image is captured, and as a result, the time at which the screen change image is captured is the same as the response output time.

The controller 12 may subtract a time at which the test signal is applied from a time at which the detected screen change image is captured to measure a response time of the measurement target facility 20.

For example, when the time at which the test signal is applied is "10:05:05", and the time at which the screen change image is captured is "10:05:09", the controller 12 may subtract a time at which the test signal is applied from a time at which the screen change image is captured, and thus the subtraction result "00:00:04" is measured as a response time of the measurement target facility 20.

The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

[Second embodiment] Detection of response output time in capture device

The measurement apparatus 10 may include a transceiver 11 configured to receive capture information from the capture device 40 for capturing the output screen 30 of the measurement target facility 20, and a controller 12 configured to apply the test signal to the measurement target facility 20 through the transceiver 11, and measure a response time of the measurement target facility 20 based on the capture information, wherein the capture device 40 detects a response output time which is a time at which a response corresponding to the test signal is displayed on the output screen 30, and generates capture information containing the response output time.

The measurement target facility 20 may be connected to the transceiver 11 included in the measurement apparatus 10, and may include the output screen 30.

The measurement target facility 20 may receive the test signal through the transceiver 11 included in the measurement apparatus 10, and display the output of the measurement target facility 20 corresponding to the test signal on the output screen 30.

The capture device 40 may be a camera capable of image capture or video capture, and storing the captured image and video as data.

Furthermore, the capture device 40 may be either one of a manual camera or automatic camera, and transmit the capture information to the measurement apparatus 10.

The capture device 40 may be a camera capable of automatically capturing the output screen 30.

For example, when the response output is displayed on the output screen 30 or a change is generated on the output screen 30, the capture device 40 may automatically capture the output screen 30.

Furthermore, the capture device 40 may perform a capture operation under the control of the controller 12.

For example, when the controller 12 applies the test signal to the measurement target facility 20 through the transceiver 11, the capture device 40 may be subject to the control of the controller 12 to capture the response output to be displayed on the output screen 30.

The capture information may be generated based on a result of capturing the output screen 30 by the capture device 40, and may further include either one of an image and a video in which the output screen 30 of the measurement target facility 20 is captured.

For example, the capture information may include only the response output time, and may further include an image on which the output screen 30 is captured or include the response output time, both an image and a video in which the output screen 30 is captured.

The test signal may be applied to an input end of the measurement target facility 20.

The test signal may be applied to the measurement target facility 20 with an analog or digital mode signal.

The test signal may be a control signal for inducing a specific output to be displayed on the output screen 30 of the measurement target facility 20.

The response output time may be a time at which an output is displayed on the output screen 30 to generate a screen change on the output screen 30.

The transceiver 11 is subject to the control of the controller 12.

The transceiver 11 may include an analog or digital input/output terminal, and transmit and receive a signal between the measurement target facility 20 and the capture device 40.

The controller 12 controls the transceiver 11 to apply the test signal to the measurement target facility 20, and measures a response time based on the capture information received at the transceiver 11.

The controller 12 calculates a time difference between a time at which the test signal is applied and the response output time to measure the time difference as a response time of the measurement target facility 20.

Hereinafter, a specific embodiment of the second embodiment of a response time measurement apparatus disclosed in the present disclosure will be described.

[Embodiment 2-1] Detection of output image in capture device

[Embodiment 2-1] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement apparatus 10 may include a transceiver 11 configured to receive capture information from the capture device 40 for capturing the output screen 30 of the measurement target facility 20, and a controller 12 configured to apply a test signal to the measurement target facility 20 through the transceiver 11, and measure a response time of the measurement target facility 20 based on the capture information, wherein the capture device 40 detects a response output time which is a time at which a response corresponding to the test signal is displayed on the output screen 30, and generates capture information containing the response output time, and consecutively captures the output screen 30 to generate a plurality of images and time information on which each image is captured, and detects an output image on which a specific output corresponding to the test signal is displayed among the plurality of images and time information on which the output image is captured, and detects the response output time based on the time information on which the output image is captured to generate the capture information containing the output image and the response output time, and the controller 12 detects the response output time contained in the capture information, and subtracts a time at the test signal is applied from the response output time to measure a response time of the measurement target facility 20.

Here, the plurality of consecutively captured images are multiple images in which the capture device 40 has captured the output screen 30 several times for a continuous period of time.

Furthermore, the plurality of images may be images consecutively captured for a predetermined and/or desired period of time.

For example, they may be images captured several times for a continuous period of time from a time at which the test signal is applied to a time at which the response output is displayed on the output screen 30.

The capture device 40 may detect the output image contained in the capture information among the plurality of images.

For example, when a test signal for allowing a phrase "This is a test signal" to be displayed on the output screen 30 is applied to the measurement target facility 20, the capture device 40 detects an output image on which the phrase "This is a test signal" is captured among the plurality of images.

In other words, the capture device 40 may detect an output image on which an output corresponding to the response output is first captured among the plurality of images.

Furthermore, the capture device 40 may detect time information on which the output image is captured through the detected output image.

For example, when the output image is captured at "10:05:04", the capture device 40 may detect the capture time information of "10:05:04" which is a time at which the output image is captured through the detected image.

Furthermore, the capture device 40 may detect the response output time through the capture time information.

Here, the capture device 40 may compensate a time consumed for capture for the capture time information to detect the response output time.

For example, when the capture time information is "10:05:04", and the time consumed for capture is 0.5 second, the capture device 40 compensates the time consumed for capture for the detected capture time information to detect the response output time of "10:05:03.5".

Furthermore, when the time consumed for capture is close to zero second and thus the capture time information is the same as the response output time, the capture device 40 may detect the capture time information as the response output time.

When the capture information is received at the transceiver 11, the controller 12 may detect the output image and the response output time contained in the capture information.

The controller 12 may subtract a time at which the test signal is applied from the response output time to measure a response time of the measurement target facility 20.

For example, when the time at which the test signal is applied is "10:05:05", and the response output time is "10:05:09", the controller 12 may subtract a time at which the test signal is applied from the response output time and thus the subtraction result "00:00:04" is measured as a response time of the measurement target facility 20. The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

[Embodiment 2-2] Detection of screen change image in capture device

[Embodiment 2-2] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement apparatus 10 may include a transceiver 11 configured to receive capture information from the capture device 40 for capturing the output screen 30 of the measurement target facility 20, and a controller 12 configured to apply a test signal to the measurement target facility 20 through the transceiver 11, and measure a response time of the measurement target facility 20 based on the capture information, wherein the capture device 40 detects a response output time which is a time at which a response corresponding to the test signal is displayed on the output screen 30, and generates capture information containing the response output time, and consecutively captures the output screen 30 from a time at which the test signal is applied to generate a plurality of images and time information on which each image is captured, and detects a screen change image on which a change is generated on the output screen 30 among the plurality of images and time information on which the screen change image is captured, and detects the response output time based on the time information on which the screen change image is captured to generate the capture information containing the screen change image and the response output time, and the controller 12 detects the response output time contained in the capture information, and subtracts a time at the test signal is applied from the response output time to measure a response time of the measurement target facility 20.

Here, the plurality of consecutively captured images are multiple images in which the capture device 40 has captured the output screen 30 several times for a continuous period of time from a time at which the test signal is applied.

The capture device 40 may detect the screen change image contained in the capture information among the plurality of images.

For example, when a test signal for allowing a phrase "This is a test signal" to be displayed on the output screen 30 is applied to the measurement target facility 20, the capture device 40 may compare an image in which a change is generated on the output screen 30 with an image prior to generating a change on the output screen 30, and detect the screen change image when determined that a change has been generated due to a difference on the entire or a specific portion of the output screen 30, and the screen change image may be an image on which the phrase "This is a test signal" is displayed.

In other words, the capture device 40 may detect a screen change image on which a change is generated on the output screen 30 due to the response output corresponding to the test signal among the plurality of images.

Furthermore, the capture device 40 may detect time information on which the screen change image is captured through the detected screen change image.

For example, when the screen change image is captured at "10:05:04", the capture device 40 may detect the capture time information of "10:05:04" which is a time at which the screen change image is captured through the detected screen change image.

Here, the capture device 40 may compensate a time consumed for capture for the capture time information to detect the response output time.

For example, when the capture time information is "10:05:04", and the time consumed for capture is 0.5 second, the capture device 40 compensates the time consumed for capture for the detected capture time information to detect the response output time of "10:05:03.5".

Furthermore, when the time consumed for capture is close to zero second and thus the capture time information is the same as the response output time, the capture device 40 may detect the capture time information as the response output time.

When the capture information is received at the transceiver 11, the controller 12 may detect the output image and the response output time contained in the capture information.

The controller 12 may subtract a time at which the test signal is applied from the response output time to measure a response time of the measurement target facility 20.

For example, when the time at which the test signal is applied is "10:05:05", and the response output time is "10:05:09", the controller 12 may subtract a time at which the test signal is applied from the response output time and thus the subtraction result "00:00:04" is measured as a response time of the measurement target facility 20.

The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

Hereinafter, a third embodiment of a response time measurement apparatus disclosed in the present disclosure will be described with reference to FIGS. 6 and 7.

Figure 6:
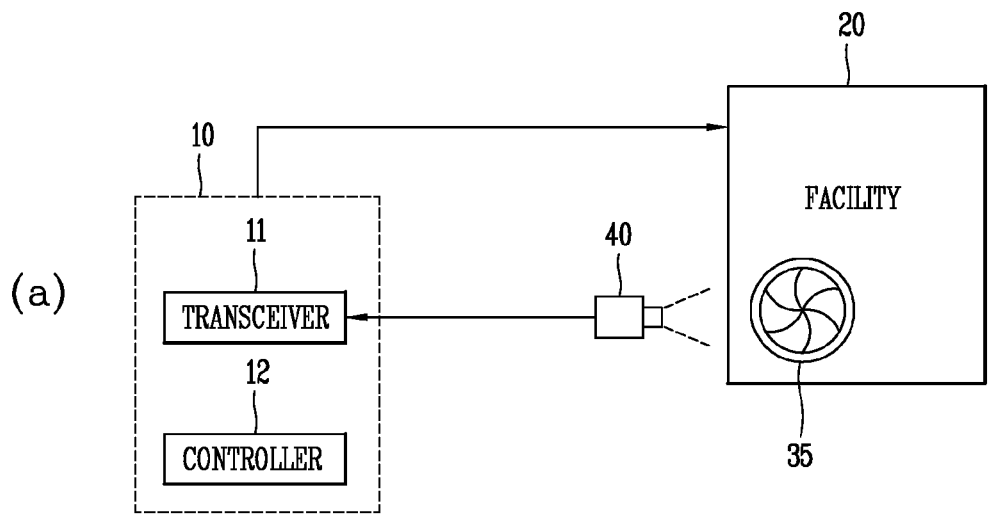
FIG. 6 is a configuration diagram illustrating a response time measurement apparatus according to an example embodiment.
Figure 6:
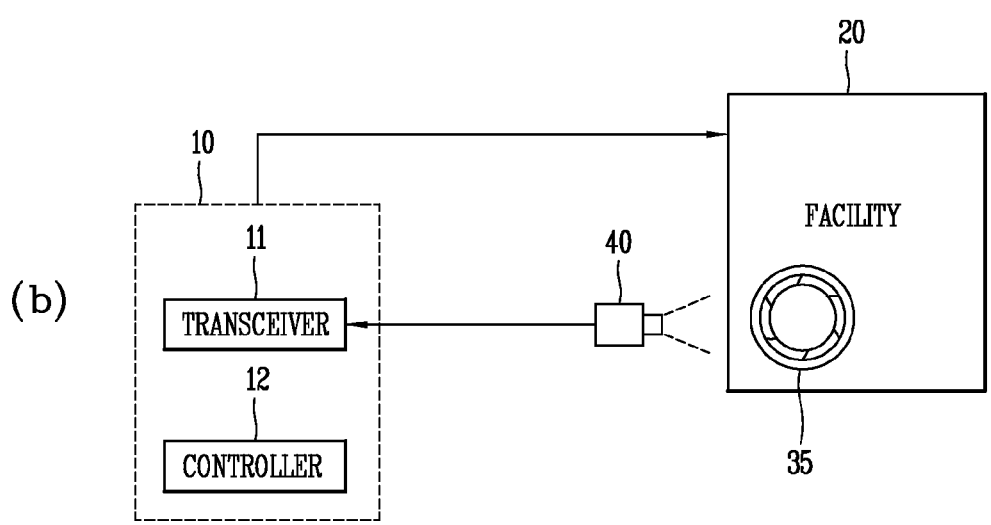

FIG. 6 is a configuration diagram 3 illustrating a response time measurement apparatus disclosed in the present disclosure.

Figure 7:
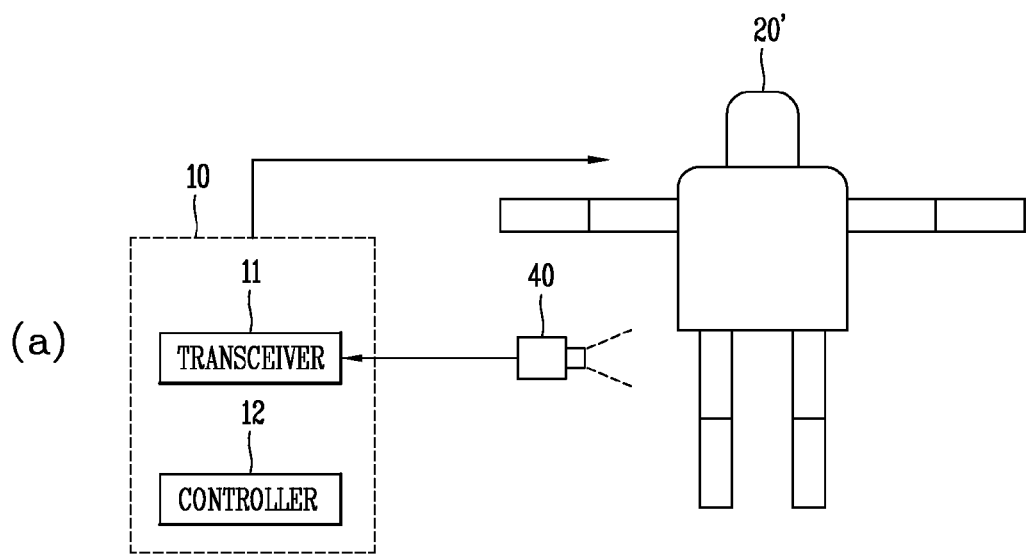
FIG. 7 is a configuration diagram illustrating a response time measurement apparatus according to an example embodiment.
Figure 7:
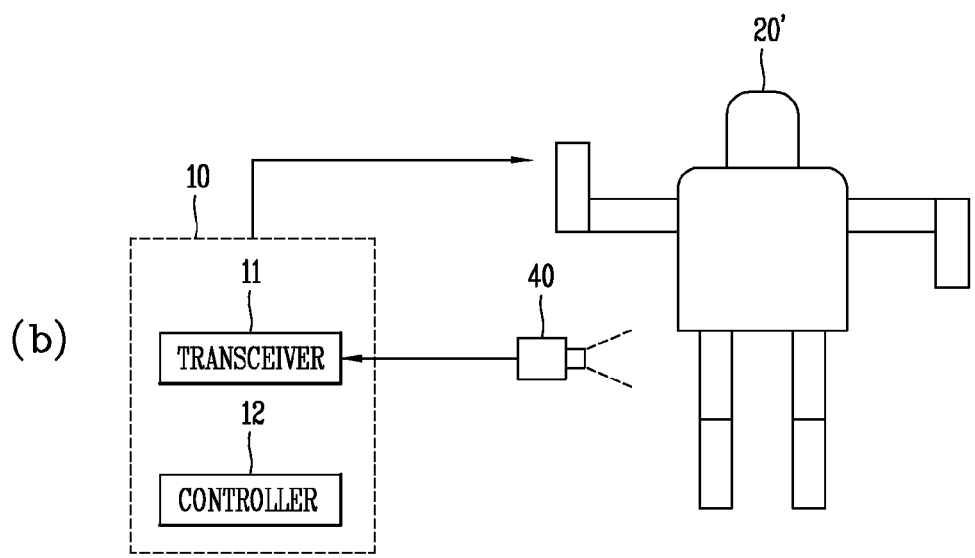

FIG. 7 is a configuration diagram 4 illustrating a response time measurement apparatus disclosed in the present disclosure.

[Third embodiment] Detection of operation generation time in measurement apparatus As illustrated in FIGS. 6 and 7, the measurement apparatus 10 may include a transceiver 11 configured to receive capture information from a capture device 40 for capturing the operation of measurement target facility 20, 20', and a controller 12 configured to apply a test signal to the measurement target facility 20, 20' through the transceiver 11, and detect an operation generation time which is a time at which a response corresponding to the test signal is generated by the operation of the measurement target facility 20, 20' based on the capture information, and measure a response time of the measurement target facility based on the operation generation time.

The measurement apparatus 10 may have the form of a typical measurement device or a portable small-sized instrument such as a digital meter.

Furthermore, the measurement apparatus 10 may be an apparatus contained in a large-scale facility group, and may have a detachable form which is detachable from the facility group.

Furthermore, the measurement apparatus 10 may have a module form contained in a device such as a computer or the like.

The measurement target facility 20 as a facility performing a mechanical operation may include at least one of a power facility, an automation process facility, a transportation facility, a control and management facility, an analog facility, a digital facility, a small-sized home appliance, a robot and a computer.

The power facility denotes a facility performing a mechanical operation associated with power such as a generator, an electric motor, a breaker, a switch, a relay and an instrument, and the like.

The measurement target facility 20 may be connected to the transceiver 11 included in the measurement apparatus 10, and may include an operation unit 35 performing a mechanical operation.

The measurement target facility 20 may receive the test signal through the transceiver 11 included in the measurement apparatus 10, and output an output of the measurement target facility 20 corresponding to the test signal as a mechanical operation or an operation of the operation unit 35.

For example, the operation unit 35 performs an operation in response to the test signal when the operation unit 35 is a facility contained in part of the facility, and the facility itself performs a mechanical operation in response to the test signal when the facility itself is a facility performing a mechanical operation.

A more detailed example will be described below with reference to FIGS. 6 and 7.

Referring to FIG. 6, the measurement target facility 20 in FIG. 6 is a facility in which the operation unit 35 is included in part of the facility, and a switching port corresponding to the operation unit 35 performs an operation in response to the test signal.

For example, the switching port is closed as illustrated in FIG. 6A prior to applying the test signal to the measurement target facility 20, but the switching port is open as illustrated in FIG. 6B when the test signal is applied thereto.

Referring to FIG. 7, the measurement target facility 20' in FIG. 7 is a facility in which the facility itself performs a mechanical operation, and the facility itself performs a mechanical operation in response to the test signal.

For example, the measurement target facility 20' is in a stopped state as illustrated in FIG. 7A prior to applying the test signal to the measurement target facility 20', but the measurement target facility 20' performs a mechanical operation as illustrated in FIG. 7B when the test signal is applied thereto.

Hereinafter, the detailed description according to the present embodiment will be followed with reference to FIG. 6.

The capture device 40 may be a camera capable of image capture or video capture, and storing the captured image and video as data.

Furthermore, the capture device 40 may be either one of a manual camera or automatic camera, and transmit the capture information to the measurement apparatus 10.

The capture device 40 may be a camera capable of automatically capturing the output screen 30.

Furthermore, the capture device 40 may perform a capture operation under the control of the controller 12.

The capture information may be generated based on a result of capturing the mechanical operation of the measurement target facility 20 by the capture device 40.

The capture information may include at least one of an image, a video in which the output screen 30 of the measurement target facility 20 is captured and time information on which the output of the measurement target facility 20 is captured.

For example, the capture information may include only an image in which the mechanical operation is captured, or include an image in which the mechanical operation is captured and time information on which the mechanical operation is captured, or include both an image, a video and the time information on which the mechanical operation is captured.

The test signal may be applied to an input end of the measurement target facility 20.

The test signal may be applied to the measurement target facility 20 with an analog or digital mode signal.

The test signal may be a control signal for inducing a specific operation of the measurement target facility 20.

For example, the test signal may be a control signal for inducing the switching operation of the switching port included in the measurement target facility 20 as illustrated in FIG. 6, or a control signal for inducing an operation to move an arm of the measurement target facility 20' in a vertical direction as illustrated in FIG. 7.

The operation generation time may be a time at which a specific operation corresponding to the test signal while the measurement target facility 20 is stopped or performs a specific operation to generate an operation change of the measurement target facility 20.

Here, the operation change denotes displaying a response of the measurement target facility 20 corresponding to the test signal as the mechanical operation to make a change from a screen prior to the output to a screen on which the response is displayed.

In other words, a change of the operation of the measurement target facility 20 is generated by the response output, wherein a time at which the operation change is generated becomes a response output time.

The transceiver 11 is subject to the control of the controller 12.

The transceiver 11 may include an analog or digital input/output terminal, and transmit and receive a signal between the measurement target facility 20 and the capture device 40.

The controller 12 controls the transceiver 11 to apply the test signal to the measurement target facility 20, and measures a response time based on the capture information received at the transceiver 11.

The controller 12 calculates a time difference between a time at which the test signal is applied and the operation generation time to measure the time difference as a response time of the measurement target facility 20.

In other words, when a time at which the test signal is applied is subtracted from the operation generation time, the response time of the measurement target facility 20 is calculated.

For example, in case where the time at which the test signal is applied is "10:05:03", and the operation generation time is "10:05:05", a period of time "00:00:02" in which the time at which the test signal is applied is subtracted from the operation generation time will be a response time of the measurement target facility 20.

Hereinafter, a specific embodiment of the third embodiment of a response time measurement apparatus disclosed in the present disclosure will be described with reference to 7.

[embodiment 3-1] Detection of operation image in measurement Apparatus

[Embodiment 3-1] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement apparatus 10 may include a transceiver 11 configured to receive capture information from the capture device 40 for capturing the operation of the measurement target facility 20', and a controller 12 configured to apply a test signal to the measurement target facility 20' through the transceiver 11, and detect a operation generation time which is a time at which a response corresponding to the test signal is generated by the operation of the measurement target facility 20' based on the capture information, and measure a response time of the measurement target facility based on the operation generation time, wherein the capture information may include a plurality of images on which the operation of the measurement target facility 20' is consecutively captured from a time at which the test signal is applied and time information on which each image is captured, and the controller 12 detects an operation image on which a specific operation corresponding to the test signal is generated on the output screen 30 among the plurality of images and time information on which the operation image is captured, and subtracts a time at which the test signal is applied from a time at which the operation image is captured to measure a response time of the measurement target facility 20'.

Here, the plurality of consecutively captured images are multiple images in which the capture device 40 has captured the measurement target facility 20' several times for a continuous period of time from the time at which the test signal is applied.

For example, when the capture device 40 has captured the measurement target facility 20' for four seconds, four images may be captured once per second or two images once per two seconds.

The capture information may be the plurality of images in which the capture device 40 has captured the measurement target facility 20' several times for a continuous period of time and time information on which each image is captured.

For example, when the measurement target facility 20' has been captured four times for four seconds from "10:05:00" to "10:05:04", a first captured image may include time information "10:05:01", and a second captured image, a third captured image and a fourth captured image may include time information "10:05:02", "10:05:03" and "10:05:04", respectively.

When the capture information is received at the transceiver 11, the controller 12 may detect an operation image on which a specific operation corresponding to the test signal is generated among a plurality of images contained in the capture information.

For example, when a test signal for "operating an arm to move in a vertical direction" is applied to the measurement target facility 20', the controller 12 detects an operation image on which an operation generation for "operating the arm to move in a vertical direction" is captured among the plurality of images.

In other words, the controller 12 may detect an operation image on which an operation corresponding to the operation generation is first captured among the plurality of images.

Furthermore, the controller 12 may detect the operation image by comparing it with an image prior to generating the specific operation.

For example, when the operation image is an image on which an operation generation for "operating both arms in a vertical direction" is captured, and the image prior to generating the specific operation is an image on which a stopped state is captured, the controller 12 compares the image prior to generating the specific operation with the operation image to detect a portion at which a change is generated, and determines that the operation image is the image prior to generating the specific operation based on the portion at which a change is generated to detect the operation image.

Furthermore, the controller 12 may detect time information on which operation image is captured through the detected operation image.

For example, when the operation image is captured at "10:05:04", the controller 12 may detect the capture time information of "10:05:04" which is a time at which the operation image is captured through the detected operation image.

Here, the time at which the operation image is captured is the same as the operation generation time or a time for which a time consumed for capture is compensated to be the same as the operation generation time.

For example, when a time at which the operation generation is displayed on the measurement target facility 20' is "10:05:04" and a time at which the operation generation is captured is "10:05:04.5", the controller 12 compensates 0.5 second consumed for the capture for a time at which the operation image is captured, and as a result, the time at which the operation image is captured is the same as the operation generation time.

The controller 12 may subtract a time at which the test signal is applied from a time at which the detected operation image is captured to measure a response time of the measurement target facility 20'.

For example, when the time at which the test signal is applied is "10:05:05", and the time at which the operation image is captured is "10:05:09", the controller 12 may subtract a time at which the test signal is applied from a time at which the operation image is captured, and thus the subtraction result "00:00:04" is measured as a response time of the measurement target facility 20'.

The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

The measurement apparatus 10 configured to include the transceiver 11 and the controller 12 may be also applicable to an embodiment of a response time measurement system disclosed in the present disclosure as well as an embodiment of a response time measurement method disclosed in the present disclosure.

<Response Time Measurement System>

Hereinafter, an embodiment of a response time measurement system (hereinafter, referred to as a "measurement system") disclosed in the present disclosure will be described.

First, the configuration of the measurement system 100 will be described in brief with reference to FIG. 8.

Figure 8:
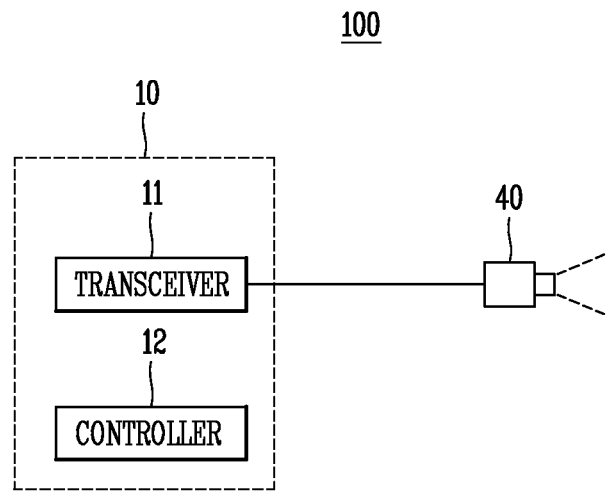
FIG. 8 is a configuration diagram illustrating a response time measurement system according to an example embodiment.

FIG. 8 is a configuration diagram illustrating a response time measurement system disclosed in the present disclosure.

As illustrated in FIG. 8, the measurement system 100 may include the measurement apparatus 10 including the transceiver 11 and the controller 12, and the capture device 40.

In other words, the measurement system 100 may include the measurement apparatus 10 disclosed in the present disclosure and the capture device 40.

The measurement apparatus 10 may have the form of a typical measurement device or a portable small-sized instrument such as a digital meter.

Furthermore, the measurement apparatus 10 may be an apparatus contained in a large-scale facility group, and may have a detachable form which is detachable from the facility group.

Furthermore, the measurement apparatus 10 may have a module form contained in a device such as a computer or the like.

The capture device 40 may be a camera capable of automatically capturing the output screen 30.

Furthermore, the capture device 40 may perform a capture operation under the control of the controller 12.

The capture device 40 may be a camera capable of image capture or video capture, and storing the captured image and video as data.

Furthermore, the capture device 40 may be either one of a manual camera or automatic camera, and transmit the capture information to the measurement apparatus 10.

The transceiver 11 and the controller 12 may have a module form included in the measurement apparatus 10.

The transceiver 11 may include an analog or digital input/output terminal, and transmit and receive a signal under the control of the controller 12.

Hereinafter, an embodiment of the measurement system 100 disclosed in the present disclosure will be described with reference to FIG. 9.

Figure 9:
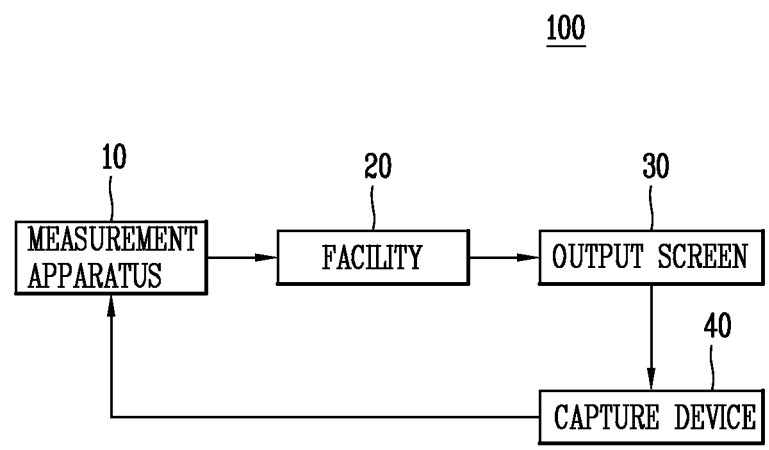
FIG. 9 is a block diagram illustrating a response time measurement system according to an example embodiment.

FIG. 9 is a block diagram illustrating the response time measurement system 100 disclosed in the present disclosure.

[First embodiment] Detection of response output time in measurement device

As illustrated in FIG. 9, the measurement system 100 may include a capture device 40 configured to capture the output screen 30 of the measurement target facility 20 to generate capture information, and the measurement apparatus 10 including a transceiver 11 configured to receive the capture information, and a controller 12 configured to apply a test signal to the measurement target facility 20 through the transceiver 11, and detect a response output time which is a time at which a response corresponding to the test signal is displayed on the output screen 30 based on the capture information, and measure a response time of the measurement target facility 20 based on the response output time.

The measurement target facility 20 may include at least one of a plant consisting of a plurality of devices, a power facility, a communication facility, a transportation facility, a video facility, a control and management facility, an analog facility, a digital facility, a small-sized home appliance, a robot and a computer.

The plant may denote a production facility or plant configured with an industrial device, a machine tool, an electrical device, a communication device and the like as an integrated body, and there may be a large-scale power plant or the like for an example.

The measurement system 100 applicable to the plant may be applicable to a central control facility and system performing the control of each device constituting the plant or the entire control of the plant.

For example, the measurement apparatus 10 may be applicable to a nuclear measurement control system (MMIS), or instrument, generator, transformer and the like which are the detailed configuration of the nuclear power plant.

The measurement target facility 20 may be connected to the transceiver 11 included in the measurement apparatus 10, and may include the output screen 30.

The measurement target facility 20 may receive the test signal through the transceiver 11 included in the measurement apparatus 10, and display the output of the measurement target facility 20 corresponding to the test signal on the output screen 30.

The output screen 30 denotes a display screen on which an output corresponding to an input signal applied to the measurement target facility 20 is displayed.

The output screen 30 may be externally configured to be separated from the measurement target facility 20, or configured to be included in the measurement target facility 20.

When the output screen 30 is externally configured to be separated from the measurement target facility 20, the output screen 30 may be a display device of a console computer for controlling the measurement target facility 20 or a monitor additionally connected thereto.

When the output screen 30 is externally configured to be separated from the measurement target facility 20, a location at which the output screen 30 is installed may be arranged regardless of the location of the measurement target facility 20.

When the output screen 30 is configured to be included in the measurement target facility 20, the output screen 30 may be a display unit configured at any one portion of the measurement target facility 20 or display apparatus additionally mounted thereon.

The test signal may be applied to an input end of the measurement target facility 20.

The test signal may be applied to the measurement target facility 20 with an analog or digital mode signal.

The test signal may be a control signal for inducing a specific output to be displayed on the output screen 30 of the measurement target facility 20.

The response output time may be a time at which an output is displayed on the output screen 30 to generate a screen change on the output screen 30.

Here, the screen change denotes displaying a response of the measurement target facility 20 corresponding to the test signal on the output screen 30 to make a change from a screen prior to the output to a screen on which the response is displayed.

In other words, a screen change is generated on the output screen 30 by the response output, wherein a time at which the screen change is generated becomes the response output time.

The transceiver 11 is subject to the control of the controller 12.

The transceiver 11 may include an analog or digital input/output terminal, and transmit and receive a signal between the measurement target facility 20 and the capture device 40.

The controller 12 controls the transceiver 11 to apply the test signal to the measurement target facility 20, and measures a response time based on the capture information received at the transceiver 11.

The controller 12 calculates a time difference between a time at which the test signal is applied and the response output time to measure the time difference as a response time of the measurement target facility 20.

In other words, when a time at which the test signal is applied is subtracted from the response output time, the response time of the measurement target facility 20 is calculated.

Hereinafter, a specific embodiment of the first embodiment of a response time measurement system disclosed in the present disclosure will be described.

[Embodiment 1-1] Detection of output image in measurement apparatus

[Embodiment 1-1] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement system 100 may include a capture device 40 for capturing the output screen 30 of the measurement target facility 20 to generate capture information, and the measurement apparatus 10 including a transceiver 11 configured to receive the capture information, and a controller 12 configured to apply a test signal to the measurement target facility 20 through the transceiver 11, and detect a response output time which is a time at which a response corresponding to the test signal is displayed on the output screen 30 based on the capture information, and measure a response time of the measurement target facility 20 based on the response output time, wherein the capture information may include a plurality of images on which the output screen 30 is consecutively captured and time information on which each image is captured, and the controller 12 detects an output image displayed with a specific output corresponding to the test signal among the plurality of images contained in the capture information and time information on which the output image is captured, and subtracts a time at which the test signal is applied from a time at which the output image is captured to measure a response time of the measurement target facility 20.

Here, the plurality of consecutively captured images are multiple images in which the capture device 40 has captured the output screen 30 several times for a continuous period of time.

Furthermore, the plurality of images may be images consecutively captured for a predetermined and/or desired period of time.

For example, they may be images captured several times for a continuous period of time from a time at which the test signal is applied to a time at which the response output is displayed on the output screen 30.

The capture information may be the plurality of images in which the capture device 40 has captured the output screen 30 several times for a continuous period of time and time information on which each image is captured.

For example, when the output screen 30 has been captured four times for four seconds from "10:05:00" to "10:05:04", a first captured image may include time information "10:05:01", and a second captured image, a third captured image and a fourth captured image may include time information "10:05:02", "10:05:03" and "10:05:04", respectively.

When the capture information is received at the transceiver 11, the controller 12 may detect an output image on which a specific output corresponding to the test signal is displayed among a plurality of images contained in the capture information.

For example, when a test signal for allowing a phrase "This is a test signal" to be displayed on the output screen 30 is applied to the measurement target facility 20, the controller 12 detects an output image on which the phrase "This is a test signal" is captured among the plurality of images.

In other words, the controller 12 may detect an output image on which an output corresponding to the response output is first captured among the plurality of images.

Furthermore, the controller 12 may detect time information on which each image is captured through the detected output image.

For example, when the output image is captured at "10:05:04", the controller 12 may detect the capture time information of "10:05:04" which is a time at which the output image is captured through the detected output image.

Here, the time at which the output image is captured is the same as the response output time or a time for which a time consumed for capture is compensated to be the same as the response output time.

For example, when a time at which the response output is displayed on the output screen 30 is "10:05:04" and a time at which the response output is captured is "10:05:04.5", the controller 12 compensates 0.5 second consumed for the capture for a time at which the response output is captured, and as a result, the time at which the output image is captured is the same as the response output time.

The controller 12 may subtract a time at which the test signal is applied from a time at which the detected output image is captured to measure a response time of the measurement target facility 20.

For example, when the time at which the test signal is applied is "10:05:05", and the time at which the output image is captured is "10:05:09", the controller 12 may subtract a time at which the test signal is applied from a time at which the output image is captured to measure a response time of the measurement target facility, and thus the subtraction result "00:00:04" is measured as a response time of the measurement target facility 20.

The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

[Embodiment 1-2] Detection of screen change image in measurement apparatus

[Embodiment 1-2] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement system 100 may include a capture device 40 for capturing the output screen 30 of the measurement target facility 20 to generate capture information, and the measurement apparatus 10 including a transceiver 11 configured to receive capture information, and a controller 12 configured to apply a test signal to the measurement target facility 20 through the transceiver 11, and detect a response output time which is a time at which a response corresponding to the test signal is displayed on the output screen 30 based on the capture information, and measure a response time of the measurement target facility 20 based on the response output time, wherein the capture information may include a plurality of images on which the output screen 30 is consecutively captured from a time at which the test signal is applied and time information on which each image is captured, and the controller 12 detects a screen change image on which a change is generated on the output screen 30 among the plurality of images and time information on which the screen change image is captured, and subtracts a time at which the test signal is applied from a time at which the screen change image is captured to measure a response time of the measurement target facility 20.

Here, the plurality of consecutively captured images are multiple images in which the capture device 40 has captured the output screen 30 several times for a continuous period of time from the time at which the test signal is applied.

The capture information may be the plurality of images in which the capture device 40 has captured the output screen 30 several times for a continuous period of time and time information on which each image is captured.

For example, when the output screen 30 has been captured four times for four seconds from "10:05:00" to "10:05:04", a first captured image may include time information "10:05:01", and a second captured image, a third captured image and a fourth captured image may include time information "10:05:02", "10:05:03" and "10:05:04", respectively.

When the capture information is received at the transceiver 11, the controller 12 may detect the screen change image on which a change is generated on the output screen 30 among a plurality of images contained in the capture information.

Here, the screen change image denotes an image in which a screen on which a change is generated on the output screen 30 is captured due to the response output of the measurement target facility 20 corresponding to the test signal.

In other words, the screen change image denotes an image in which the response output is captured.

For example, when the measurement apparatus 10 applies a test signal for allowing a phrase "This is a test signal" to be displayed on the output screen 30 to the measurement target facility 20, the controller 12 may compare an image in which a change is generated on the output screen 30 with an image prior to generating a change on the output screen 30, and detect the screen change image when determined that a change has been generated due to a difference on the entire or a specific portion of the output screen 30, and the screen change image may be an image on which the phrase "This is a test signal" is displayed.

In other words, the controller 12 may detect a screen change image in which a screen on which a change is generated on the output screen 30 due to the response output corresponding to the terminal among the plurality of images.

Furthermore, the controller 12 may detect time information on which the screen change image is captured through the detected screen change image.

For example, when the screen change image is captured at "10:05:04", the controller 12 may detect the capture time information of "10:05:04" which is a time at which the screen change image is captured through the detected screen change image.

Here, the time at which the screen change image is captured is the same as the response output time or a time for which a time consumed for capture is compensated to be the same as the response output time.

For example, when a time at which the response output is displayed on the output screen 30 is "10:05:04" and a time at which the response output is captured is "10:05:04.5", the controller 12 compensates 0.5 second consumed for the capture for a time at which the screen change image is captured, and as a result, the time at which the screen change image is captured is the same as the response output time.

The controller 12 may subtract a time at which the test signal is applied from a time at which the detected screen change image is captured to measure a response time of the measurement target facility 20.

For example, when the time at which the test signal is applied is "10:05:05", and the time at which the screen change image is captured is "10:05:09", the controller 12 may subtract a time at which the test signal is applied from a time at which the screen change image is captured, and thus the subtraction result "00:00:04" is measured as a response time of the measurement target facility 20.

The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

Hereinafter, a second embodiment of a response time measurement system disclosed in the present disclosure will be described.

[Second embodiment] Detection of response output time in capture device

The measurement system 100 may include a capture device 40 for capturing the output screen 30 of the measurement target facility 20 to generate capture information, and the measurement apparatus 10 including a transceiver 11 configured to receive the capture information from the capture device 40, and a controller 12 configured to apply the test signal to the measurement target facility 20 through the transceiver 11, and measure a response time of the measurement target facility 20 based on the capture information, wherein the capture device 40 detects a response output time which is a time at which a response corresponding to the test signal is displayed on the output screen 30, and generates capture information containing the response output time.

The measurement target facility 20 may include at least one of a plant consisting of a plurality of devices, a power facility, a communication facility, a transportation facility, a video facility, a control and management facility, an analog facility, a digital facility, a small-sized home appliance, a robot and a computer.

The plant may denote a production facility or plant configured with an industrial device, a machine tool, an electrical device, a communication device and the like as an integrated body, and there may be a large-scale power plant or the like for an example.

The measurement system 100 applicable to the plant may be applicable to a central control facility and system performing the control of each device constituting the plant or the entire control of the plant.

For example, the measurement apparatus 10 may be applicable to a nuclear measurement control system (MMIS), or instrument, generator, transformer and the like which are the detailed configuration of the nuclear power plant.

The measurement target facility 20 may be connected to the transceiver 11 included in the measurement apparatus 10, and may include the output screen 30.

The measurement target facility 20 may receive the test signal through the transceiver 11 included in the measurement apparatus 10, and display the output of the measurement target facility 20 corresponding to the test signal on the output screen 30.

The output screen 30 denotes a display screen on which an output corresponding to an input signal applied to the measurement target facility 20 is displayed.

The output screen 30 may be externally configured to be separated from the measurement target facility 20, or configured to be included in the measurement target facility 20.

When the output screen 30 is externally configured to be separated from the measurement target facility 20, the output screen 30 may be a display device of a console computer for controlling the measurement target facility 20 or a monitor additionally connected thereto.

When the output screen 30 is externally configured to be separated from the measurement target facility 20, a location at which the output screen 30 is installed may be arranged regardless of the location of the measurement target facility 20.

When the output screen 30 is configured to be included in the measurement target facility 20, the output screen 30 may be a display unit configured at any one portion of the measurement target facility 20 or display apparatus additionally mounted thereon.

The capture information may be generated based on a result of capturing the output screen 30 by the capture device 40, and may further include either one of an image and a video in which the output screen 30 of the measurement target facility 20 is captured.

For example, the capture information may include only the response output time, and may further include an image on which the output screen 30 is captured or include the response output time, both an image and a video in which the output screen 30 is captured.

The test signal may be applied to an input end of the measurement target facility 20.

The test signal may be applied to the measurement target facility 20 with an analog or digital mode signal.

The test signal may be a control signal for inducing a specific output to be displayed on the output screen 30 of the measurement target facility 20.

The response output time may be a time at which an output is displayed on the output screen 30 to generate a screen change on the output screen 30.

The transceiver 11 is subject to the control of the controller 12.

The transceiver 11 may include an analog or digital input/output terminal, and transmit and receive a signal between the measurement target facility 20 and the capture device 40.

The controller 12 controls the transceiver 11 to apply the test signal to the measurement target facility 20, and measures a response time based on the capture information received at the transceiver 11.

The controller 12 calculates a time difference between a time at which the test signal is applied and the response output time to measure the time difference as a response time of the measurement target facility 20.

In other words, when a time at which the test signal is applied is subtracted from the response output time, the response time of the measurement target facility 20 is calculated.

Hereinafter, a specific embodiment of the first embodiment of a response time measurement system disclosed in the present disclosure will be described.

[Embodiment 2-1] Detection of output image in capture device

[Embodiment 2-1] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement system 100 may include a capture device 40 for capturing the output screen 30 of the measurement target facility 20 to generate capture information, and the measurement apparatus 10 including a transceiver 11 configured to receive the capture information from the capture device 40, and a controller 12 configured to apply a test signal to the measurement target facility 20 through the transceiver 11, and measure a response time of the measurement target facility 20 based on the capture information, wherein the capture device 40 detects a response output time which is a time at which a response corresponding to the test signal is displayed on the output screen 30, and generates capture information containing the response output time, and consecutively captures the output screen 30 to generate a plurality of images and time information on which each image is captured, and detects an output image on which a specific output corresponding to the test signal is displayed among the plurality of images and time information on which the output image is captured, and detects the response output time based on the time information on which the output image is captured to generate the capture information containing the output image and the response output time, and the controller 12 detects the response output time contained in the capture information, and subtracts a time at the test signal is applied from the response output time to measure a response time of the measurement target facility 20.

Here, the plurality of consecutively captured images are multiple images in which the capture device 40 has captured the output screen 30 several times for a continuous period of time.

Furthermore, the plurality of images may be images consecutively captured for a predetermined and/or desired period of time.

For example, they may be images captured several times for a continuous period of time from a time at which the test signal is applied to a time at which the response output is displayed on the output screen 30.

The capture device 40 may detect the output image contained in the capture information among the plurality of images.

For example, when a test signal for allowing a phrase "This is a test signal" to be displayed on the output screen 30 is applied to the measurement target facility 20, the capture device 40 detects an output image on which the phrase "This is a test signal" is captured among the plurality of images.

In other words, the capture device 40 may detect an output image on which an output corresponding to the response output is first captured among the plurality of images.

Furthermore, the capture device 40 may detect time information on which the output image is captured through the detected output image.

For example, when the output image is captured at "10:05:04", the capture device 40 may detect the capture time information of "10:05:04" which is a time at which the output image is captured through the detected image.

Furthermore, the capture device 40 may detect the response output time through the capture time information.

Here, the capture device 40 may compensate a time consumed for capture for the capture time information to detect the response output time.

For example, when the capture time information is "10:05:04", and the time consumed for capture is 0.5 second, the capture device 40 compensates the time consumed for capture for the detected capture time information to detect the response output time of "10:05:03.5".

Furthermore, when the time consumed for capture is close to zero second and thus the capture time information is the same as the response output time, the capture device 40 may detect the capture time information as the response output time.

When the capture information is received at the transceiver 11, the controller 12 may detect the output image and the response output time contained in the capture information.

The controller 12 may subtract a time at which the test signal is applied from the response output time to measure a response time of the measurement target facility 20.

For example, when the time at which the test signal is applied is "10:05:05", and the response output time is "10:05:09", the controller 12 may subtract a time at which the test signal is applied from the response output time and thus the subtraction result "00:00:04" is measured as a response time of the measurement target facility 20. The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

[Embodiment 2-2] Detection of screen change image in capture device

[Embodiment 2-2] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement system 100 may include a capture device 40 for capturing the output screen 30 of the measurement target facility 20 to generate capture information, and the measurement apparatus 10 including a transceiver 11 configured to receive capture information from the capture device 40, and a controller 12 configured to apply a test signal to the measurement target facility 20 through the transceiver 11, and measure a response time of the measurement target facility 20 based on the capture information, wherein the capture device 40 detects a response output time which is a time at which a response corresponding to the test signal is displayed on the output screen 30, and generates capture information containing the response output time, and consecutively captures the output screen 30 from a time at which the test signal is applied to generate a plurality of images and time information on which each image is captured, and detects a screen change image on which a change is generated on the output screen 30 among the plurality of images and time information on which the screen change image is captured, and detects the response output time based on the time information on which the screen change image is captured to generate the capture information containing the screen change image and the response output time, and the controller 12 detects the response output time contained in the capture information, and subtracts a time at the test signal is applied from the response output time to measure a response time of the measurement target facility 20.

Here, the plurality of consecutively captured images are multiple images in which the capture device 40 has captured the output screen 30 several times for a continuous period of time from a time at which the test signal is applied.

The capture device 40 may detect the screen change image contained in the capture information among the plurality of images.

For example, when a test signal for allowing a phrase "This is a test signal" to be displayed on the output screen 30 is applied to the measurement target facility 20, the capture device 40 may compare an image in which a change is generated on the output screen 30 with an image prior to generating a change on the output screen 30, and detect the screen change image when determined that a change has been generated due to a difference on the entire or a specific portion of the output screen 30, and the screen change image may be an image on which the phrase "This is a test signal" is displayed.

In other words, the capture device 40 may detect a screen change image on which a change is generated on the output screen 30 due to the response output corresponding to the test signal among the plurality of images.

Furthermore, the capture device 40 may detect time information on which the screen change image is captured through the detected screen change image.

For example, when the screen change image is captured at "10:05:04", the capture device 40 may detect the capture time information of "10:05:04" which is a time at which the screen change image is captured through the detected screen change image.

Here, the capture device 40 may compensate a time consumed for capture for the capture time information to detect the response output time.

For example, when the capture time information is "10:05:04", and the time consumed for capture is 0.5 second, the capture device 40 compensates the time consumed for capture for the detected capture time information to detect the response output time of "10:05:03.5".

Furthermore, when the time consumed for capture is close to zero second and thus the capture time information is the same as the response output time, the capture device 40 may detect the capture time information as the response output time.

When the capture information is received at the transceiver 11, the controller 12 may detect the output image and the response output time contained in the capture information.

The controller 12 may subtract a time at which the test signal is applied from the response output time to measure a response time of the measurement target facility 20.

For example, when the time at which the test signal is applied is "10:05:05", and the response output time is "10:05:09", the controller 12 may subtract a time at which the test signal is applied from the response output time and thus the subtraction result "00:00:04" is measured as a response time of the measurement target facility 20.

The controller 12 may determine whether or not there is an error of the measurement result, and repeat the test when the reimplementation of the measurement is required.

For example, in case that there is an error in the measurement target facility 20, in case that an image contained in the capture information is unclear, in case that the response output time is not properly detected, or the like during a measurement operation, the controller 12 may determine it, and re-implement the test for the accurate measurement of the response time.

<Response Time Measurement Method>

Hereinafter, the configuration of a response time measurement method (hereinafter, referred to as a "measurement method") disclosed in the present disclosure will be described with reference to FIGS. 10 and 11.

Figure 10:
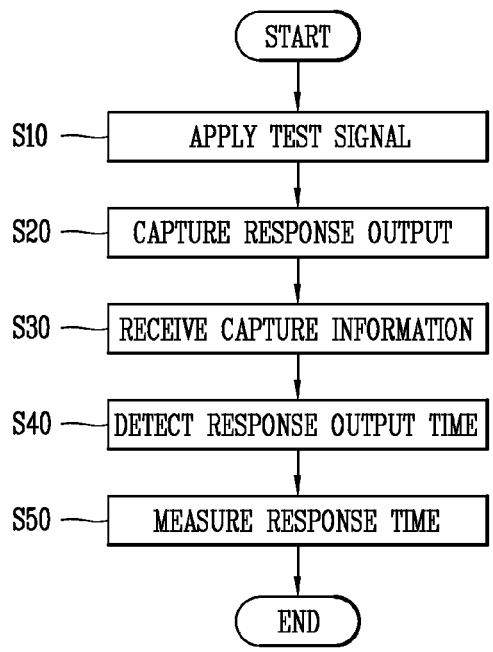
FIG. 10 is a flow chart illustrating a response time measurement method according to an example embodiment.

FIG. 10 is a flow chart 1 illustrating a response time measurement method in the present disclosure.

Figure 11:
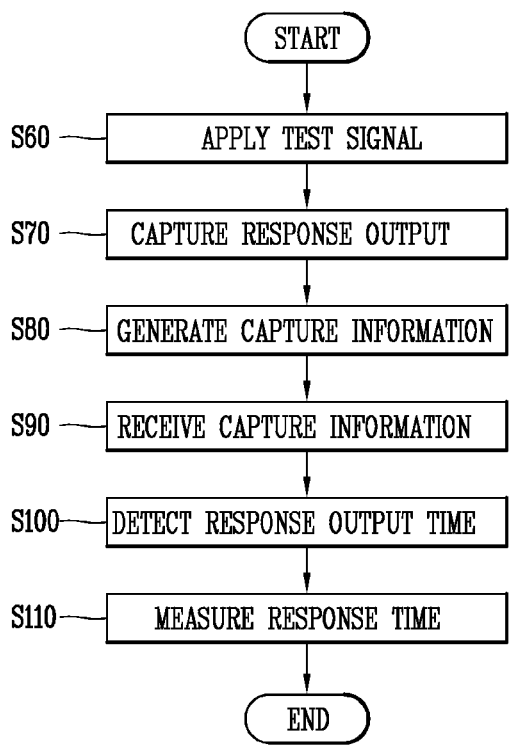
FIG. 11 is a flow chart illustrating a response time measurement method according to an example embodiment.

FIG. 11 is a flow chart 2 illustrating a response time measurement method in the present disclosure.

[First embodiment] Detection of response output time in measurement process

As illustrated in FIG. 10, the measurement method may include the step (S10) of applying a test signal to a measurement target facility, the step (S20) of capturing a response output corresponding to the test signal displayed on the output screen of the measurement target facility with a capture device, the step (S30) of receiving capture information from the capture device, the step (S40) of detecting the response output time based on the capture information, and the step (S50) of measuring a response time of the measurement target facility based on the response output time.

The measurement target facility may include at least one of a plant consisting of a plurality of devices, a power facility, a communication facility, a transportation facility, a video facility, a control and management facility, an analog facility, a digital facility, a small-sized home appliance, a robot and a computer.

The plant may denote a production facility or plant configured with an industrial device, a machine tool, an electrical device, a communication device and the like as an integrated body, and there may be a large-scale power plant or the like for an example.

The measurement method applicable to the plant may be applicable to a central control facility performing the control of each device constituting the plant or the entire control of the plant.

For example, the measurement method may be applicable to a nuclear measurement control system (MMIS), or instrument, generator, transformer and the like which are the detailed configuration of the nuclear power plant.

The power facility denotes all facilities associated with power such generators, transformers, transmission and distribution facilities and incoming transfer facilities, instruments, control facilities, control systems, and the like.

The measurement target facility may include the output screen.

The measurement target facility may receive the test signal, and display an output corresponding to the test signal on the output screen.

The output screen denotes a display screen on which an output corresponding to an input signal applied to the measurement target facility is displayed.

The output screen may be externally configured to be separated from the measurement target facility, or configured to be included in the measurement target facility.

When the output screen is externally configured to be separated from the measurement target facility, the output screen may be a display device of a console computer for controlling the measurement target facility or a monitor additionally connected thereto.

When the output screen is externally configured to be separated from the measurement target facility, a location at which the output screen is installed may be arranged regardless of the location of the measurement target facility.

When the output screen is configured to be included in the measurement target facility, the output screen may be a display unit configured at any one portion of the measurement target facility or display apparatus additionally mounted thereon.

For example, the output screen may be a monitor of an integrated computer, an LCD of a mobile terminal, an LCD of a digital meter, a display unit of a home appliance such as an air conditioner, a cleaner, and the like.

The capture device may be a camera capable of automatically capturing the output screen.

For example, when the response output is displayed on the output screen or a change is generated on the output screen, the capture device may automatically capture the output screen.

The capture device may be a camera capable of image capture or video capture, and storing the captured image and video as data.

Furthermore, the capture device may be either one of a manual camera or automatic camera.

The capture information may be generated based on a result of capturing the output screen by the capture device.

The capture information may include at least one of an image, a video in which the output screen 30 of the measurement target facility 20 is captured and time information on which the output of the measurement target facility 20 is captured.

For example, the capture information may include only an image in which the output screen is captured, or include an image in which the output screen 30 is captured and time information on which the output of the measurement target facility is captured, or include both an image, a video and the time information on which the output screen is captured.

The test signal may be applied to an input end of the measurement target facility.

The test signal may be applied to the measurement target facility with an analog or digital mode signal.

The test signal may be a control signal for inducing a specific output to be displayed on the output screen of the measurement target facility.

For example, a numeral, a symbol, a picture, a photo, a specific phrase or the like indicating a test signal may be displayed on the output screen.

The test signal may display a specific phrase indicating a test signal on the output screen, or display a specific picture.

Furthermore, the test signal may display a specific interface for test, or display a specific phrase or picture indicating a test signal at a specific portion of the output screen.

For example, when the measurement apparatus applies a test signal for allowing a phrase "This is a test signal" to be displayed on the output screen to the measurement target facility, the phrase "This is a test signal" will be displayed on the output screen.

The response output time may be a time at which an output is displayed on the output screen to generate a screen change on the output screen.

Here, the screen change denotes displaying a response of the measurement target facility corresponding to the test signal on the output screen to make a change from a screen prior to the output to a screen on which the response is displayed.

In other words, a screen change is generated on the output screen by the response output, wherein a time at which the screen change is generated becomes the response output time.

The step (S50) of measuring a response time of the measurement target facility based on the response output time may calculates a time difference between a time at which the test signal is applied and the response output time to measure the time difference as a response time of the measurement target facility.

In other words, when a time at which the test signal is applied is subtracted from the response output time, the response time of the measurement target facility is calculated.

For example, in case where the time at which the test signal is applied is "10:05:03", and the response output time is "10:05:05", a period of time "00:00:02" in which the time at which the test signal is applied is subtracted from the response output time will be a response time of the measurement target facility.

Hereinafter, a specific embodiment of the first embodiment of a response time measurement method disclosed in the present disclosure will be described.

[Embodiment 1-1] Detection of output image

[Embodiment 1-1] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement method may include the step (S10) of applying a test signal to a measurement target facility, the step (S20) of capturing a response output corresponding to the test signal displayed on the output screen of the measurement target facility with a capture device, the step (S30) of receiving capture information from the capture device, the step (S40) of detecting the response output time based on the capture information, and the step (S50) of measuring a response time of the measurement target facility based on the response output time, wherein the capture information may include a plurality of images on which the output screen is consecutively captured and time information on which each image is captured, and the step (S40) of detecting the response output time based on the capture information detects an output image displayed with a specific output corresponding to the test signal among the plurality of images contained in the capture information and time information on which the output image is captured, and the step (S50) of measuring a response time of the measurement target facility based on the response output time subtracts a time at which the test signal is applied from a time at which the output image is captured to measure a response time of the measurement target facility.

Here, the plurality of consecutively captured images are multiple images in which the capture device has captured the output screen several times for a continuous period of time.

Furthermore, the plurality of images may be images consecutively captured for a predetermined and/or desired period of time.

For example, they may be images captured several times for a continuous period of time from a time at which the test signal is applied to a time at which the response output is displayed on the output screen.

The capture information may include the plurality of images in which the capture device has captured the output screen several times for a continuous period of time and time information on which each image is captured.

For example, when the output screen has been captured four times for four seconds from "10:05:00" to "10:05:04", a first captured image may include time information "10:05:01", and a second captured image, a third captured image and a fourth captured image may include time information "10:05:02", "10:05:03" and "10:05:04", respectively.

The step (S40) of detecting the response output time based on the capture information may detect an output image on which a specific output corresponding to the test signal is displayed among a plurality of images contained in the capture information.

For example, when a test signal for allowing a phrase "This is a test signal" to be displayed on the output screen is applied to the measurement target facility, an output image on which the phrase "This is a test signal" is captured among the plurality of images is detected.

In other words, the controller 12 may detect an output image on which an output corresponding to the response output is first captured among the plurality of images.

Furthermore, the step (S40) of detecting the response output time based on the capture information may detect time information on which each image is captured through the detected output image.

For example, when the output image is captured at "10:05:04", the capture time information of "10:05:04" which is a time at which the output image is captured through the detected output image is detected.

Here, the time at which the output image is captured is the same as the response output time or a time for which a time consumed for capture is compensated to be the same as the response output time.

For example, when a time at which the response output is displayed on the output screen is "10:05:04" and a time at which the response output is captured is "10:05:04.5", the step of detecting the response output time based on the capture information compensates 0.5 second consumed for the capture for a time at which the response output is captured, and as a result, the time at which the output image is captured is the same as the response output time.

The step (S50) of measuring a response time of the measurement target facility based on the response output time may subtract a time at which the test signal is applied from a time at which the detected output image is captured to measure a response time of the measurement target facility.

For example, when the time at which the test signal is applied is "10:05:05", and the time at which the output image is captured is "10:05:09", a time at which the test signal is applied is subtracted from a time at which the output image is captured to measure a response time of the measurement target facility, and thus the subtraction result "00:00:04" is measured as a response time of the measurement target facility 20.

The measurement method may further include the step of repeatedly implementing the measurement.

For example, in case that there is an error in the measurement target facility 20, in case that an image contained in the capture information is unclear, in case that the response output time is not properly detected, or the like during a measurement operation, it may be determined in the step (S50) of measuring a response time of the measurement target facility based on the response output time, and may further include the step of repeatedly performing the test to implement the measurement method when the accurate measurement of the response time is required.

[Embodiment 1-2] Detection of screen change image

[Embodiment 1-2] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement method may include the step (S10) of applying a test signal to a measurement target facility, the step (S20) of capturing a response output corresponding to the test signal displayed on the output screen of the measurement target facility with a capture device, the step (S30) of receiving capture information from the capture device, the step (S40) of detecting the response output time based on the capture information, and the step (S50) of measuring a response time of the measurement target facility based on the response output time, wherein the capture information may include a plurality of images on which the output screen is consecutively captured from a time at which the test signal is applied and time information on which each image is captured, and the step (S40) of detecting the response output time based on the capture information detects a screen change image on which a change is generated on the output screen among the plurality of images and time information on which the screen change image is captured, and the step (S50) of measuring a response time of the measurement target facility based on the response output time subtracts a time at which the test signal is applied from a time at which the screen change image is captured to measure a response time of the measurement target facility.

Here, the plurality of consecutively captured images are multiple images in which the capture device has captured the output screen several times for a continuous period of time from the time at which the test signal is applied.

The capture information may be the plurality of images in which the capture device has captured the output screen several times for a continuous period of time and time information on which each image is captured.

For example, when the output screen has been captured four times for four seconds from "10:05:00" to "10:05:04", a first captured image may include time information "10:05:01", and a second captured image, a third captured image and a fourth captured image may include time information "10:05:02", "10:05:03" and "10:05:04", respectively.

The step (S40) of detecting the response output time based on the capture information may detect the screen change image on which a change is generated on the output screen among a plurality of images contained in the capture information.

Here, the screen change image denotes an image in which a screen on which a change is generated on the output screen is captured due to the response output of the measurement target facility corresponding to the test signal.

In other words, the screen change image denotes an image in which the response output is captured.

For example, when the measurement apparatus applies a test signal for allowing a phrase "This is a test signal" to be displayed on the output screen to the measurement target facility, the controller may compare an image in which a change is generated on the output screen with an image prior to generating a change on the output screen, and detect the screen change image when determined that a change has been generated due to a difference on the entire or a specific portion of the output screen, and the screen change image may be an image on which the phrase "This is a test signal" is displayed.

In other words, the controller may detect a screen change image in which a screen on which a change is generated on the output screen due to the response output corresponding to the terminal among the plurality of images.

Furthermore, the step (S40) of detecting the response output time based on the capture information may detect time information on which the screen change image is captured through the detected screen change image.

For example, when the screen change image is captured at "10:05:04", the capture time information of "10:05:04" which is a time at which the screen change image is captured is detected through the detected screen change image.

Here, the time at which the screen change image is captured is the same as the response output time or a time for which a time consumed for capture is compensated to be the same as the response output time.

For example, when a time at which the response output is displayed on the output screen is "10:05:04" and a time at which the response output is captured is "10:05:04.5", the step of detecting the response output time based on the capture information compensates 0.5 second consumed for the capture for a time at which the screen change image is captured, and as a result, the time at which the screen change image is captured is the same as the response output time.

The step (S50) of measuring a response time of the measurement target facility based on the response output time may subtract a time at which the test signal is applied from a time at which the detected screen change image is captured to measure a response time of the measurement target facility.

For example, when the time at which the test signal is applied is "10:05:05", and the time at which the screen change image is captured is "10:05:09", a time at which the test signal is applied is subtracted from a time at which the screen change image is captured, and thus the subtraction result "00:00:04" is measured as a response time of the measurement target facility.

The measurement method may further include the step of repeatedly implementing the measurement.

For example, in case that there is an error in the measurement target facility 20, in case that an image contained in the capture information is unclear, in case that the response output time is not properly detected, or the like during a measurement operation, it may be determined in the step (S50) of measuring a response time of the measurement target facility based on the response output time, and may further include the step of repeatedly performing the test to implement the measurement method when the accurate measurement of the response time is required.

Hereinafter, a second embodiment of a response time measurement method disclosed in the present disclosure will be described.

[Second embodiment] Detection of response output time during capture process

As illustrated in FIG. 11, the measurement method may include the step (S60) of applying a test signal to a measurement target facility, the step (S70) of capturing a response output corresponding to the test signal displayed on the output screen of the measurement target facility with a capture device, the step (S80) of detecting a response output time from the capture device, and generating capture information containing the response output time, the step (S90) of receiving the capture information from the capture device, the step (S100) of detecting the response output time contained in the capture information, and the step (S110) of measuring a response time of the measurement target facility based on the response output time.

The measurement target facility may include at least one of a plant consisting of a plurality of devices, a power facility, a communication facility, a transportation facility, a video facility, a control and management facility, an analog facility, a digital facility, a small-sized home appliance, a robot and a computer.

The plant may denote a production facility or plant configured with an industrial device, a machine tool, an electrical device, a communication device and the like as an integrated body, and there may be a large-scale power plant or the like for an example.

The measurement method applicable to the plant may be applicable to a central control facility performing the control of each device constituting the plant or the entire control of the plant.

For example, the measurement method may be applicable to a nuclear measurement control system (MMIS), or instrument, generator, transformer and the like which are the detailed configuration of the nuclear power plant.

The power facility denotes all facilities associated with power such generators, transformers, transmission and distribution facilities and incoming transfer facilities, instruments, control facilities, control systems, and the like.

The measurement target facility may include the output screen.

The measurement target facility may receive the test signal, and display an output corresponding to the test signal on the output screen.

The output screen denotes a display screen on which an output corresponding to an input signal applied to the measurement target facility is displayed.

The output screen may be externally configured to be separated from the measurement target facility, or configured to be included in the measurement target facility.

When the output screen is externally configured to be separated from the measurement target facility, the output screen may be a display device of a console computer for controlling the measurement target facility or a monitor additionally connected thereto.

When the output screen is externally configured to be separated from the measurement target facility, a location at which the output screen is installed may be arranged regardless of the location of the measurement target facility.

When the output screen is configured to be included in the measurement target facility, the output screen may be a display unit configured at any one portion of the measurement target facility or display apparatus additionally mounted thereon.

For example, the output screen may be a monitor of an integrated computer, an LCD of a mobile terminal, an LCD of a digital meter, a display unit of a home appliance such as an air conditioner, a cleaner, and the like.

The capture device may be a camera capable of automatically capturing the output screen.

For example, when the response output is displayed on the output screen or a change is generated on the output screen, the capture device may automatically capture the output screen.

The capture device may be a camera capable of image capture or video capture, and storing the captured image and video as data.

Furthermore, the capture device may be either one of a manual camera or automatic camera.

The capture information may be generated based on a result of capturing the output screen by the capture device, and may further include either one of an image and a video in which the output screen of the measurement target facility is captured.

For example, the capture information may include only the response output time, or may further include an image on which the output screen is captured, or include all the response output time, and an image and a video in which the output screen is captured.

The test signal may be applied to an input end of the measurement target facility.

The test signal may be applied to the measurement target facility with an analog or digital mode signal.

The test signal may be a control signal for inducing a specific output to be displayed on the output screen of the measurement target facility.

For example, a numeral, a symbol, a picture, a photo, a specific phrase or the like indicating a test signal may be displayed on the output screen.

The test signal may display a specific phrase indicating a test signal on the output screen, or display a specific picture.

Furthermore, the test signal may display a specific interface for test, or display a specific phrase or picture indicating a test signal at a specific portion of the output screen.

For example, when the measurement apparatus applies a test signal for allowing a phrase "This is a test signal" to be displayed on the output screen to the measurement target facility, the phrase "This is a test signal" will be displayed on the output screen.

The response output time may be a time at which an output is displayed on the output screen to generate a screen change on the output screen.

Here, the screen change denotes displaying a response of the measurement target facility corresponding to the test signal on the output screen to make a change from a screen prior to the output to a screen on which the response is displayed.

In other words, a screen change is generated on the output screen by the response output, wherein a time at which the screen change is generated becomes the response output time.

The step (S110) of measuring a response time of the measurement target facility based on the response output time may calculates a time difference between a time at which the test signal is applied and the response output time to measure the time difference as a response time of the measurement target facility.

In other words, when a time at which the test signal is applied is subtracted from the response output time, the response time of the measurement target facility is calculated.

For example, in case where the time at which the test signal is applied is "10:05:03", and the response output time is "10:05:05", a period of time "00:00:02" in which the time at which the test signal is applied is subtracted from the response output time will be a response time of the measurement target facility.

Hereinafter, a specific embodiment of the second embodiment of a response time measurement system disclosed in the present disclosure will be described.

[Embodiment 2-1] Detection of output image

[Embodiment 2-1] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement method may include the step (S60) of applying a test signal to a measurement target facility, the step (S70) of capturing a response output corresponding to the test signal displayed on the output screen of the measurement target facility with a capture device, the step (S80) of detecting a response output time from the capture device, and generating capture information containing the response output time, the step (S90) of receiving the capture information from the capture device, the step (S100) of detecting the response output time contained in the capture information, and the step (S110) of measuring a response time of the measurement target facility based on the response output time, wherein the step (S70) of capturing a response output corresponding to the test signal displayed on the output screen of the measurement target facility with a capture device consecutively captures the output screen to generate a plurality of images and time information on which each image is captured, and the step (S80) of detecting a response output time from the capture device, and generating capture information containing the response output time detects an output image displayed with a specific output corresponding to the test signal among the plurality of images and time information on which the output image is captured, and detects the response output time based on time information on which the output image is captured to generate the capture information containing the output image and the response output time, and the step (S110) of measuring a response time of the measurement target facility based on the response output time subtracts a time at which the test signal is applied from the response output time to measure a response time of the measurement target facility.

Here, the plurality of consecutively captured images are multiple images in which the capture device has captured the output screen several times for a continuous period of time.

Furthermore, the plurality of images may be images consecutively captured for a predetermined and/or desired period of time.

For example, they may be images captured several times for a continuous period of time from a time at which the test signal is applied to a time at which the response output is displayed on the output screen.

The capture device may detect the output image contained in the capture information among the plurality of images.

For example, when a test signal for allowing a phrase "This is a test signal" to be displayed on the output screen is applied to the measurement target facility, the capture device detects an output image on which the phrase "This is a test signal" is captured among the plurality of images.

In other words, the capture device may detect an output image on which an output corresponding to the response output is first captured among the plurality of images.

Furthermore, the capture device may detect time information on which the output image is captured through the detected output image.

For example, when the output image is captured at "10:05:04", the capture device may detect the capture time information of "10:05:04" which is a time at which the output image is captured through the detected image.

Furthermore, the capture device may detect the response output time through the capture time information.

Here, the capture device may compensate a time consumed for capture for the capture time information to detect the response output time.

For example, when the capture time information is "10:05:04", and the time consumed for capture is 0.5 second, the capture device 40 compensates the time consumed for capture for the detected capture time information to detect the response output time of "10:05:03.5".

Furthermore, when the time consumed for capture is close to zero second and thus the capture time information is the same as the response output time, the capture device may detect the capture time information as the response output time.

The step (S100) of detecting the response output time contained in the capture information may detect the output image and the response output time contained in the capture information.

The step (S110) of measuring a response time of the measurement target facility based on the response output time may subtract a time at which the test signal is applied from the response output time to measure a response time of the measurement target facility.

For example, when the time at which the test signal is applied is "10:05:05", and the response output time is "10:05:09", a time at which the test signal is applied is subtracted from the response output time and thus the subtraction result "00:00:04" is measured as a response time of the measurement target facility.

The measurement method may further include the step of repeatedly implementing the measurement.

For example, in case that there is an error in the measurement target facility, in case that an image contained in the capture information is unclear, in case that the response output time is not properly detected, or the like during a measurement operation, it may be determined in the step (S110) of measuring a response time of the measurement target facility based on the response output time, and may further include the step of repeatedly performing the test to implement the measurement method when the accurate measurement of the response time is required.

[Embodiment 2-2] Detection of screen change image

[Embodiment 2-2] disclosed in the present disclosure may be implemented by part or in any combination of components or steps included in the foregoing embodiments or implemented in any combination of the embodiments, and technical terms used herein are merely used to describe a specific embodiment, and does not limit the concept of the technology disclosed in the present disclosure.

The measurement method may include the step (S60) of applying a test signal to a measurement target facility, the step (S70) of capturing a response output corresponding to the test signal displayed on the output screen of the measurement target facility with a capture device, the step (S80) of detecting a response output time from the capture device, and generating capture information containing the response output time, the step (S90) of receiving the capture information from the capture device, the step (S100) of detecting the response output time contained in the capture information, and the step (S110) of measuring a response time of the measurement target facility based on the response output time, wherein the step (S70) of capturing a response output corresponding to the test signal displayed on the output screen of the measurement target facility with a capture device consecutively captures the output screen from a time at which the test signal is applied to generate a plurality of images and time information on which each image is captured, and the step (S80) of detecting a response output time from the capture device, and generating capture information containing the response output time detects a screen change image on which a change is generated on the output screen among the plurality of images and time information on which the screen change image is captured, and detects the response output time based on time information on which the screen change image is captured to generate the capture information containing the screen change image and the response output time, and the step (S110) of measuring a response time of the measurement target facility based on the response output time subtracts a time at which the test signal is applied from the response output time to measure a response time of the measurement target facility.

Here, the plurality of consecutively captured images are multiple images in which the capture device has captured the output screen several times for a continuous period of time from a time at which the test signal is applied.

The capture device may detect the screen change image contained in the capture information among the plurality of images.

For example, when a test signal for allowing a phrase "This is a test signal" to be displayed on the output screen is applied to the measurement target facility, the capture device may compare an image in which a change is generated on the output screen with an image prior to generating a change on the output screen, and detect the screen change image when determined that a change has been generated due to a difference on the entire or a specific portion of the output screen, and the screen change image may be an image on which the phrase "This is a test signal" is displayed.

In other words, the capture device may detect a screen change image on which a change is generated on the output screen due to the response output corresponding to the test signal among the plurality of images.

Furthermore, the capture device may detect time information on which the screen change image is captured through the detected screen change image.

For example, when the screen change image is captured at "10:05:04", the capture device may detect the capture time information of "10:05:04" which is a time at which the screen change image is captured through the detected screen change image.

Here, the capture device may compensate a time consumed for capture for the capture time information to detect the response output time.

For example, when the capture time information is "10:05:04", and the time consumed for capture is 0.5 second, the capture device compensates the time consumed for capture for the detected capture time information to detect the response output time of "10:05:03.5".

Furthermore, when the time consumed for capture is close to zero second and thus the capture time information is the same as the response output time, the capture device may detect the capture time information as the response output time.

When the step (S100) of detecting the response output time contained in the capture information may detect the screen change image and the response output time contained in the capture information.

The step (S110) of measuring a response time of the measurement target facility based on the response output time may subtract a time at which the test signal is applied from the response output time to measure a response time of the measurement target facility.

For example, when the time at which the test signal is applied is "10:05:05", and the response output time is "10:05:09", a time at which the test signal is applied is subtracted from the response output time and thus the subtraction result "00:00:04" is measured as a response time of the measurement target facility.

The measurement method may further include the step of repeatedly implementing the measurement.

For example, in case that there is an error in the measurement target facility, in case that an image contained in the capture information is unclear, in case that the response output time is not properly detected, or the like during a measurement operation, it may be determined in the step (S110) of measuring a response time of the measurement target facility based on the response output time, and may further include the step of repeatedly performing the test to implement the measurement method when the accurate measurement of the response time is required.

Hereinafter, an example to which an embodiment disclosed in the present disclosure is applied will be described with reference to FIG. 12.

An embodiment of a response time measurement apparatus, an embodiment of a response time measurement system, and an embodiment of a response time measurement method will be applicable to an example described below.

Furthermore, a combination of one or more of the foregoing embodiments may be applicable to an example.

Figure 12:
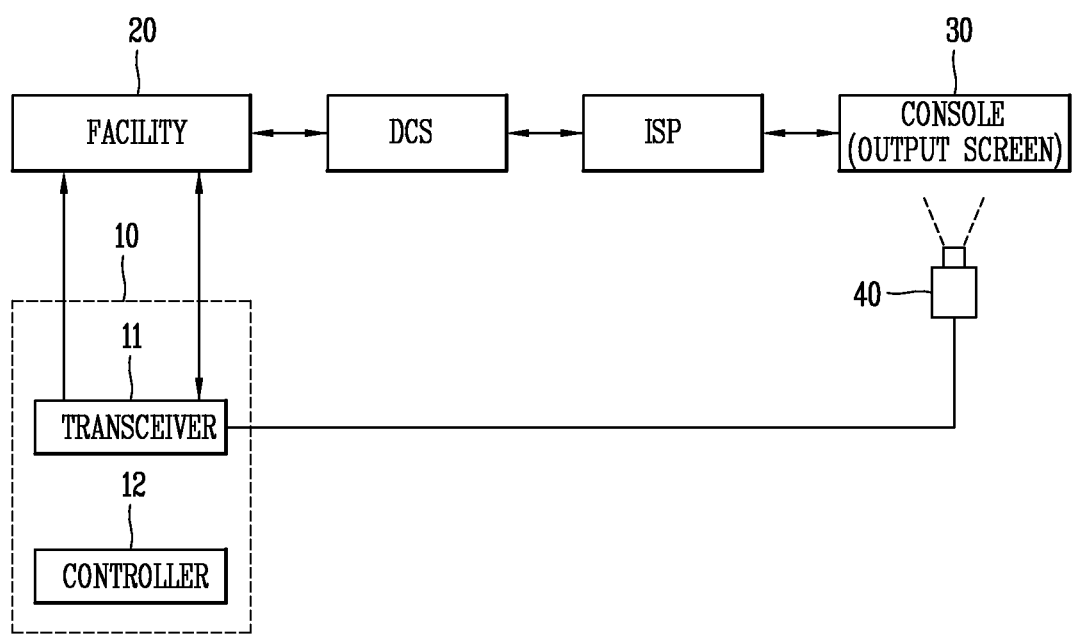
FIG. 12 is a block diagram illustrating an MMIS to which an example embodiment is applied.

FIG. 12 is a block diagram illustrating an MMIS to which an embodiment disclosed in the present disclosure is applied.

As illustrated in FIG. 12, the measurement apparatus 10 may be applicable to a facility group configured with a plurality of facilities.

A facility group illustrated in FIG. 12 illustrates a man-machine interface system (MMIS) in charge of a measurement control of a plant, and for example, there is a nuclear power control and measurement system for performing the measurement control of a nuclear power plant.

The MMIS may be configured with a facility, a distribute control system (DCS), an information processing system (IPS), and a console.

The DCS denotes a distributed control system for controlling a plurality of facilities, respectively, included in the facility group.

The IPS denotes an information processing system for transmitting the operation information of the plant to the console or controlling the operation information thereof.

The console includes the output screen 30, and denotes a device for displaying the operation information of the plant on the output screen 30.

The measurement apparatus 10 includes the transceiver 11 and the controller 12, and is connected to the measurement target facility 20 through the transceiver 11 to perform signal transmission and reception, and receives the capture information from the capture device 40 for capturing the output screen 30 of the measurement target facility 20.

When the test signal is applied to the measurement target facility 20, the signal applied to the measurement target facility 20 is transferred to the DCS, and the test signal is transferred to the console through the IPS from the DCS.

In other words, a response time of the measurement target facility 20 is a period of time from a time at which the test signal is applied to the measurement target facility 20 to a time at which the response output is displayed on the output screen 30 via the DCS and the IPS.

The console displays the response output corresponding to the test signal of the measurement target facility 20 through the output screen 30.

The capture device 40 captures the response output displayed on the output screen 30, and transmits the capture information to the transceiver 11.

The controller 12 measures a response time of the measurement target facility 20 based on a time at which the test signal is applied and the capture information received at the transceiver 11.

The embodiments of a response time measurement apparatus, a response time measurement system, and a response time measurement method disclosed in the present disclosure may be applicable to a control and safety management system for their implementation.

The embodiments of a response time measurement apparatus, a response time measurement system, and a response time measurement method disclosed in the present disclosure may be applicable to a software method for programming a response time measurement process for their implementation, and implemented with a combination of one or more of the foregoing embodiments.

The embodiments of a response time measurement apparatus, a response time measurement system, and a response time measurement method disclosed in the present disclosure may be applicable to a conduction test of a home appliance, a small facility, a lighting facility, or the like for their implementation.

The embodiments of a response time measurement apparatus, a response time measurement system, and a response time measurement method disclosed in the present disclosure may be applicable to a conduction test of a cable such as a power line, a communication line, or the like for their implementation.

The embodiments of a response time measurement apparatus, a response time measurement system, and a response time measurement method disclosed in the present disclosure may be applicable to a response time measurement of a fire facility and system or the like related to safety management for their implementation.

The embodiments of a response time measurement apparatus, a response time measurement system, and a response time measurement method disclosed in the present disclosure may be applicable to the safety management of all facilities and installations used for residential, building, public, commercial and industrial purposes for their implementation.

A response time measurement apparatus, a response time measurement system, and a response time measurement method disclosed in the present disclosure may have an effect of enhancing the accuracy of measurement as well as automating data measurement through an output detection scheme using vision compared to a scheme that uses a stop watch in the related art.

Furthermore, a response time measurement apparatus, a response time measurement system, and a response time measurement method disclosed in the present disclosure may have an effect of detecting an output regardless of the form and type of facility, the type of input test signals, and the type of output, measuring a response time in an easy and convenient manner, and enhancing flexibility with a simple configuration expected to be applicable to various fields.

The foregoing preferred embodiments of the present disclosure are disclosed to solve technical tasks, and it will be apparent to those skilled in this art that various modifications, variations and additions can be made thereto without departing from the spirit and scope of example embodiments. Those modifications and the like should be construed to be included in the following claims.

What is claimed is:

1. A response time measurement apparatus, comprising:
a transceiver configured to receive capture information from a capture device for capturing an output screen of a measurement facility; and
a controller configured to apply a test signal to the measurement facility through the transceiver, and detect an output time, the output time being a time at which a response corresponding to the test signal is displayed on the output screen based on the capture information, the controller further configured to measure a response time of the measurement facility based on the output time, wherein
the capture information comprises a plurality of images consecutively captured by the capture device and time information for each captured image, and
the controller is configured to detect an output image displayed with an output corresponding to the test signal among the plurality of images, the controller is further configured to detect the time information for the output image, and subtract a time at which the test signal is applied by the controller from a time at which the output image is captured by the capture device to measure the response time of the measurement facility.

2. The response time measurement apparatus of claim 1, wherein the test signal is a control signal for inducing a desired output to be displayed on the output screen of the measurement facility.

3. The response time measurement apparatus of claim 1, wherein the capture device is configured to consecutively capture the plurality of images from a time at which the test signal is applied by the controller.

4. The response time measurement apparatus of claim 1, wherein the capture device is configured to capture the output image at a same time as the output time.

5. The response time measurement apparatus of claim 1, wherein the controller is configured to control the capture device and the transceiver.

6. The response time measurement apparatus of claim 1, wherein the controller is configured to determine whether there is an error in the response time and repeat the measurement of the response time.

7. A response time measurement apparatus, comprising:
a transceiver configured to receive capture information from a capture device for capturing an output screen of a measurement facility; and
a controller configured to apply a test signal to the measurement facility through the transceiver, and detect an output time, the output time being a time at which a response corresponding to the test signal is displayed on the output screen based on the capture information, the controller further configured to measure a response time of the measurement facility based on the output time, wherein the capture information comprises a plurality of images of the output screen consecutively captured by the capture device from a time at which the test signal is applied by the controller, and the capture information further comprising time information for each captured image, and the controller is configured to detect a screen change image, the screen change image having a change on the output screen among the plurality of images, the controller is further configured to detect the time information for the screen change image, and subtract a time at which the test signal is applied by the controller from a time at which the screen change image is captured by the capture device to measure the response time of the measurement facility.

8. The response time measurement apparatus of claim 7, wherein the controller is configured to detect the screen change image based on an image prior to the change occurring on the output screen.

9. The response time measurement apparatus of claim 7, wherein the time at which the screen change image is captured is the same as the output time.

10. A response time measurement apparatus, comprising:
   a transceiver configured to receive capture information from a capture device for capturing an operation of a measurement facility; and
   a controller configured to apply a test signal to the measurement facility through the transceiver, and detect an operation generation time at which a response corresponding to the test signal is generated by the operation of the measurement facility based on the capture information, the controller further configured to measure a response time of the measurement facility based on the operation generation time, wherein the capture information comprises a plurality of images of the measurement facility consecutively captured by the capture device from a time at which the test signal is applied by the controller, and the capture information further comprising time information for each captured image, and
   the controller is configured to detect an operation image associated with an operation corresponding to the test signal among the plurality of images and the time information for the operation image, and the controller is further configured to subtract a time at which the test signal is applied by the controller from a time at which the operation image is captured by the capture device to measure the response time of the measurement facility.

11. The response time measurement apparatus of claim 10, wherein the measurement facility is a facility for performing a mechanical operation.

12. The response time measurement apparatus of claim 10, wherein the test signal is a control signal for inducing a desired operation of the measurement facility.

13. A method of measuring a response time, the method comprising:
   applying a test signal to a measurement facility;
   capturing, by a capturing device, a response, the response corresponding to the test signal being displayed on an output screen of the measurement facility;
   detecting an output time from the capture device based on the captured response,
   generating capture information containing the output time;
   receiving the capture information from the capture device;
   detecting the output time contained in the capture information; and
   measuring a response time of the measurement facility based on the output time, wherein said capturing a response consecutively captures the output screen to generate a plurality of images and time information for each captured image,
   one of said detecting the output time from the capture device and said generating capture information detects an output image displayed with an output corresponding to the test signal among the plurality of images and time information for the output image, and detects an output time based on the time information for the output image, and
   said measuring the response time subtracts a time at which the test signal is applied from the output time to measure the response time of the measurement facility.

14. The method of claim 13, wherein said capturing the response consecutively captures the output screen from a time at which the test signal is applied to generate a plurality of images and time information for each captured image, and
   one of said detecting the output time from the capture device and said generating capture information detects a screen change image having a change on the output screen among the plurality of images and time information for the screen change image and detects the output time based on the time information for the screen change image, and
   said measuring the response time subtracts a time at which the test signal is applied from the output time to measure the response time of the measurement facility.

* * * * *

UNITED STATES PATENT AND TRADEMARK OFFICE
CERTIFICATE OF CORRECTION

PATENT NO. : 9,933,755 B2
APPLICATION NO. : 14/478164
DATED : April 3, 2018
INVENTOR(S) : Sam Won Lee Page 1 of 1

It is certified that error appears in the above-identified patent and that said Letters Patent is hereby corrected as shown below:

On the Title Page

Item (30) Foreign Application Priority Data should read:
Sep. 23, 2013 (KR) ............. 10-2013-0112768

Signed and Sealed this
Twelfth Day of June, 2018

Andrei Iancu
*Director of the United States Patent and Trademark Office*